(12) United States Patent
Ozaki et al.

(10) Patent No.: US 9,047,073 B2
(45) Date of Patent: Jun. 2, 2015

(54) SYSTEM METHOD FOR DETECTING A TYPE OF DEVICE WHEREIN A POTENTIAL LEVEL OF THE DEVICE DETERMINES IF POWER SHOULD BE SUPPLIED BASED ON THE TYPE OF THE DEVICE

(75) Inventors: Koji Ozaki, Yokohama (JP); Masato Matsuzawa, Kawasaki (JP); Takeshi Kawano, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 13/372,764

(22) Filed: Feb. 14, 2012

(65) Prior Publication Data

US 2012/0210023 A1 Aug. 16, 2012

(30) Foreign Application Priority Data

Feb. 14, 2011 (JP) ................................. 2011-028391
Mar. 31, 2011 (JP) ................................. 2011-079860

(51) Int. Cl.
*G06F 15/16* (2006.01)
*G06F 3/00* (2006.01)
*G06F 1/26* (2006.01)

(52) U.S. Cl.
CPC ................ *G06F 1/263* (2013.01); *G06F 1/266* (2013.01)

(58) Field of Classification Search
USPC ...................................... 710/15–19; 324/539
See application file for complete search history.

(56) References Cited

U.S. PATENT DOCUMENTS

| 6,278,598 | B1 | 8/2001 | Suzuki et al. | |
| 6,963,933 | B2 | 11/2005 | Saito et al. | |
| 7,356,715 | B2 | 4/2008 | Okayasu | |
| 7,565,458 | B2 | 7/2009 | Thijssen et al. | |
| 7,675,571 | B2 * | 3/2010 | Cheng et al. | 348/375 |
| 7,711,870 | B2 * | 5/2010 | Yoshida et al. | 710/16 |
| 7,865,639 | B2 * | 1/2011 | McCoy et al. | 710/62 |

(Continued)

FOREIGN PATENT DOCUMENTS

| JP | A-11-312968 | 11/1999 |
| JP | A-2004-094495 | 3/2004 |

(Continued)

OTHER PUBLICATIONS

Feb. 12, 2013 Japanese Office Action issued in Japanese Patent Application No. 2011-028391 (with translation).

(Continued)

*Primary Examiner* — Tammara Peyton
(74) *Attorney, Agent, or Firm* — Oliff PLC

(57) ABSTRACT

A small-sized connecting appliance is provided. An electronic appliance includes: a connecting section including a power-supply terminal and a connecting terminal to be connected to a connecting appliance; a detecting section that detects the potential of the connecting terminal; a power source control section that starts supplying power via the power-supply terminal; and an appliance recognizing section that recognizes the type of the connecting appliance based on the result of detecting the potential of the connecting terminal after the power supply start. A computer readable medium causes a computer to perform: detecting the potential of a connecting terminal connected to a connecting appliance; starting power supply via a power-supply terminal included in a connecting section that connects to the connecting appliance; and recognizing the type of the connecting appliance based on the result of detecting the potential of the connecting terminal after the power supply start.

24 Claims, 20 Drawing Sheets

(56) References Cited

U.S. PATENT DOCUMENTS

| | | | |
|---|---|---|---|
| 8,013,616 B2* | 9/2011 | Crumlin et al. | 324/539 |
| 8,156,349 B2 | 4/2012 | Nagamine | |
| 8,176,214 B2* | 5/2012 | Jones et al. | 710/14 |
| 8,275,914 B2* | 9/2012 | Kim et al. | 710/15 |
| 8,683,087 B2* | 3/2014 | Connolly | 710/11 |
| 2004/0042138 A1* | 3/2004 | Saito et al. | 361/90 |
| 2008/0150512 A1 | 6/2008 | Kawano | |
| 2010/0070659 A1* | 3/2010 | Ma et al. | 710/14 |
| 2011/0294359 A1* | 12/2011 | Cho et al. | 439/676 |

FOREIGN PATENT DOCUMENTS

| | | |
|---|---|---|
| JP | A-2005-025405 | 1/2005 |
| JP | A-2007-535211 | 11/2007 |
| JP | A-2008-140311 | 6/2008 |
| JP | A-2008-158840 | 7/2008 |
| JP | A-2009-130727 | 6/2009 |
| JP | A-2010-9208 | 1/2010 |

OTHER PUBLICATIONS

Abe, "Mini-AB receptacle connector," USB 2.0 Interface Design Technique, DEMPA, 1st Version, Jul. 15, 2008, p. 29, Japan (with translation).

Apr. 16, 2013 Japanese Office Action issued in Japanese Application No. 2011-079860 (with translation).

* cited by examiner

SYSTEM METHOD FOR DETECTING A TYPE OF DEVICE WHEREIN A POTENTIAL LEVEL OF THE DEVICE DETERMINES IF POWER SHOULD BE SUPPLIED BASED ON THE TYPE OF THE DEVICE

The contents of the following Japanese patent applications are incorporated herein by reference:
No. 2011-028391 filed on Feb. 14, 2011, and
No. 2011-079860 filed in JP on Mar. 31, 2011

BACKGROUND

1. Technical Field

The present invention relates to an electronic appliance, a connecting appliance, an electronic appliance system, and a computer readable medium.

2. Related Art

An apparatus is already known which, while operating as an A device under the USB's On-The-Go standard, connects the VBUS line to the power source circuit, and supplies power to the data transfer processing circuit from either one of the VBUS line and the power source circuit, for example from Patent Document 1.
Patent Document 1: Japanese Patent Application Publication No. 2004-94495

SUMMARY

When an electronic appliance should receive power supply from a connecting appliance connected to the electronic appliance, for enabling communication between the connecting appliance and the electronic appliance, the connecting appliance has to include a power source section in itself. However, such an internally installed power source section hinders creation of a small-size connecting appliance.

Therefore, according to a first aspect related to the innovations herein, provided is an electronic appliance including: a connecting section that includes a power-supply terminal and a connecting terminal to be connected to a connecting appliance; a detecting section that detects the potential of the connecting terminal; a power source control section that starts supplying power via the power-supply terminal; and an appliance recognizing section that recognizes the type of the connecting appliance based on the result of detecting the potential of the connecting terminal after the power supply start.

According to a second aspect related to the innovations herein, provided is a connecting appliance including: a connecting section that includes a power-supply terminal and a connected terminal to be electrically connected to a connecting terminal of an electronic appliance; and a first circuitry section that changes the potential of the connecting terminal from a first potential level to a second potential level, when the connected terminal is electrically connected to the connecting terminal, and changes the potential of the connecting terminal from the second potential level, when supplied with power from the electric appliance via the power-supply terminal.

According to a third aspect related to the innovations herein, provided is a computer readable medium for storing a program for an electronic appliance, the program causing a computer to perform: detecting the potential of a connecting terminal connected to a connecting appliance; starting power supply via a power-supply terminal included in a connecting section that connects to the connecting appliance; and recognizing the type of the connecting appliance based on the result of detecting the potential of the connecting terminal after the power supply start.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
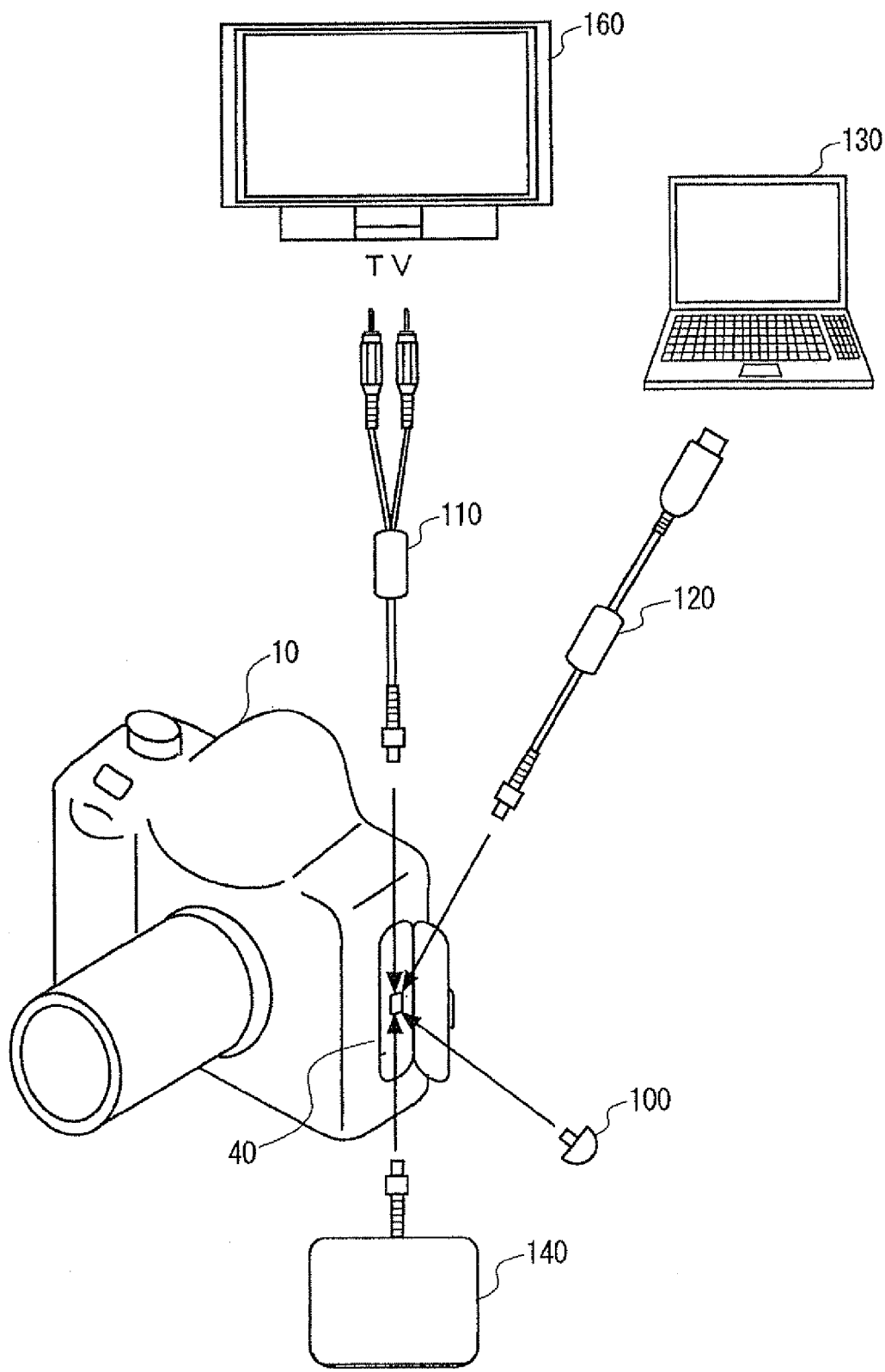
FIG. 1 shows an exemplary situation in which an electric appliance system according to an embodiment is used.

FIG. 1 shows an exemplary situation in which an electronic appliance system according to an embodiment is used. The image capturing apparatus 10, being an example of the electronic appliance, includes a wireless appliance 100, a peripheral appliance 140, a communication cable 120, and a connecting section 40 for connecting to an AV cable 110. The wireless appliance 100 is an example of the first type connecting appliance and the other appliances are an example of the second type connecting appliance.

The peripheral appliance 140 operates as a device in the USB (Universal Serial Bus) standard. An example of the peripheral appliance 140 is an external recording apparatus such as a hard disk apparatus. The image capturing apparatus 10, when the USB connecting section included in the peripheral appliance 140 is connected to the connecting section 40, supplies power to the peripheral appliance 140, as well as performing data communication as a host in a USB standard. The peripheral appliance 140 performs data communication as a device in a USB standard. In the explanation of the present embodiment, the terms "host" and "device" respectively represent a host and a device in a USB standard.

The wireless appliance 100 performs data communication as a host, but receives power supply from the image capturing apparatus 10. When the connecting section included in the wireless appliance 100 is connected to the connecting section 40, the wireless appliance 100 notifies the image capturing apparatus 10 that the wireless appliance 100 is a connecting appliance that receives power supply although it performs data communication as a host, by changing the potential of the connecting terminal included in the connecting section 40. For example, the wireless appliance 100 makes the notification to the image capturing apparatus 10 by temporary changing the potential of the ID terminal after connected to the image capturing apparatus 10. Upon detection of the change in potential of the connecting terminal, the image capturing apparatus 10 recognizes that the wireless appliance 100 is a connecting appliance that receives power supply although it performs data communication as a host. In this case, the image capturing apparatus 10 supplies power to the wireless appliance 100, though it also acts as a device in data communication with the wireless appliance 100.

The wireless appliance 100 is a connecting appliance for wireless communication. The wireless appliance 100 may perform wireless communication in compliance with a wireless communication standard such as IEEE 802.11. The wireless appliance 100 may perform wireless communication in compliance with a close range wireless communication standard such as Bluetooth (registered trademark). The wireless appliance 100 transmits, through wireless communication, the image data transferred from the image capturing apparatus 10 to a personal computer 130, a television 160, or the like.

The communication cable 120 complies with a USB standard. The communication cable 120 is used to connect, to the image capturing apparatus 10, the personal computer 130 which is an example of the connecting appliance to operate as a host. When the communication cable 120 is connected to the connecting section 40, the image capturing apparatus 10 functions as a device. In other words, the image capturing apparatus 10 receives power supply from the personal computer 130 and performs data communication as a device. For example, the image capturing apparatus 10 transfers image data to the personal computer 130, when receiving a request from the personal computer 130.

The AV cable 110 connects an audiovisual appliance such as a television 160 to the image capturing apparatus 10. The image capturing apparatus 10 outputs an AV signal to the television 160 via the AV cable 110, when receiving a user instruction to output an audiovisual signal (AV signal) to outside. The AV signal includes still image data, video data, and audio data.

The image capturing apparatus 10 performs data communication with the wireless appliance 100 as a device, while supplying power to the wireless appliance 100. Therefore, even when required to communicate with the image capturing apparatus 10 as a host, the wireless appliance 100 does not have include therein an internal power source. This helps reduce the size and the cost of the wireless appliance 100.

Figure 2:
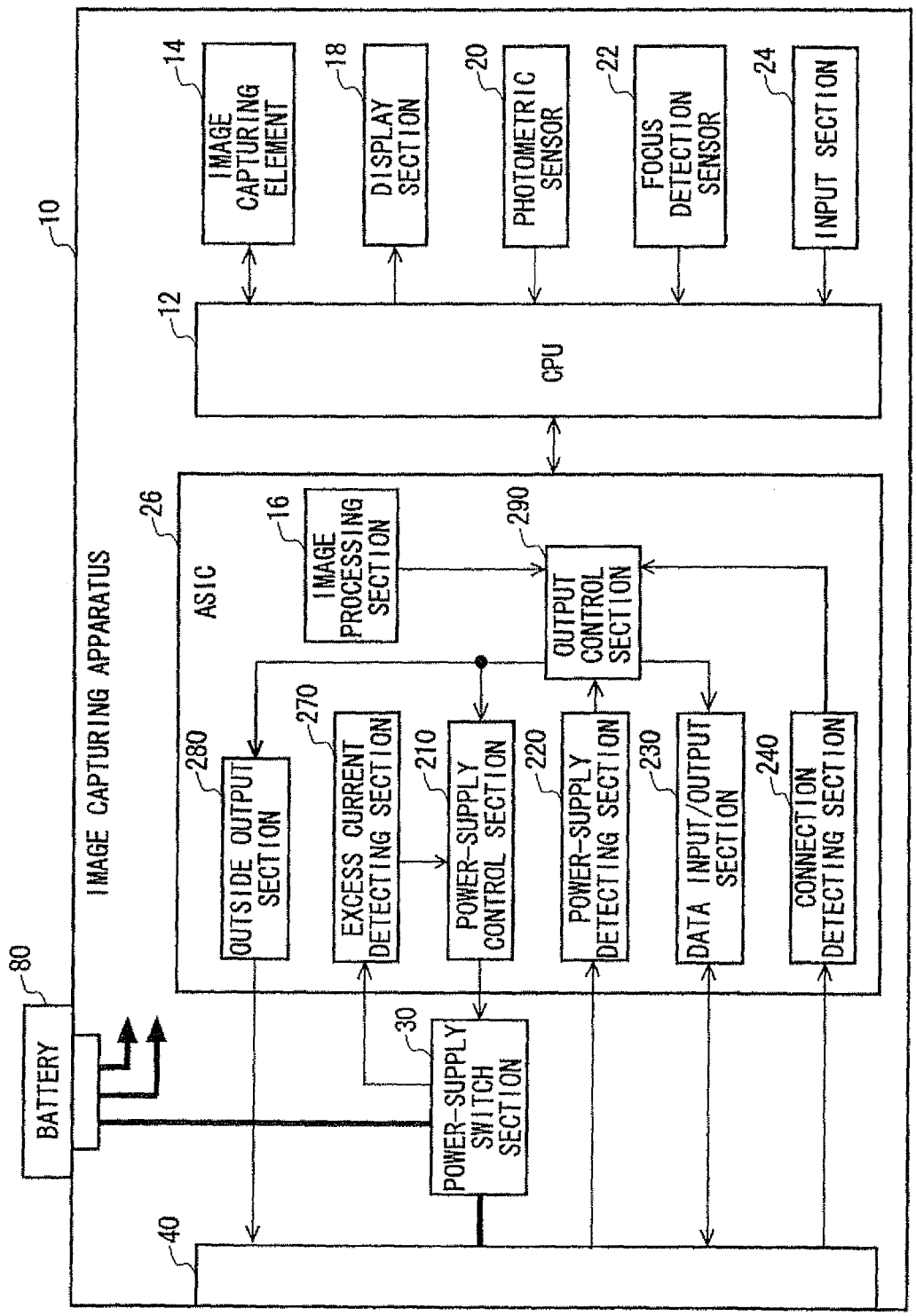
FIG. 2 shows an example of the block configuration of an image capturing apparatus 10.

FIG. 2 shows an example of the block configuration of an image capturing apparatus 10. The image capturing apparatus 10 includes a CPU (central processing unit) 12, an image capturing element 14, a display section 18, a photometric sensor 20, a focus detection sensor 22, an input section 24, an ASIC 26, a power-supply switch section 30, a connecting section 40, and a battery 80. The ASIC 26 includes an image processing section 16, a power-supply control section 210, a power supply detecting section 220, a data input/output section 230, a connection detecting section 240, an excess current detecting section 270, an outside output section 280, and an output control section 290.

The CPU 12 is responsible for control over the image capturing apparatus 10 on the whole. Connected to the CPU 12 are the image capturing element 14, the display section 18, the photometric sensor 20, the focus detection sensor 22, the input section 24, and the ASIC 26, to enable signal input and output.

The image capturing element 14 includes a CCD (charge-coupled device), a CMOS (complementary metal-oxide semiconductor), or the like. The image capturing element 14 outputs, to the ASIC 26, an image capturing signal generated by subjecting an image of an object to photoelectric conversion. The image capturing element 14 functions as an image capturing section.

The image processing section 16 subjects the image capturing signal inputted from the image capturing element 14 to analog-to-digital conversion, and then converts the result to image data. The display section 18 includes a display device such as a liquid crystal display. The display section 18 displays information such as an image of an object, setting information, or the like using the image data, under control by the CPU 12.

The photometric sensor 20 is positioned on the optical path of the light flux of the object. The photometric sensor 20 receives part of the light flux of the object incident through the lens unit. The photometric sensor 20 detects the object brightness from the received light flux of the object, and outputs the object brightness to the CPU 12. The CPU 12 calculates the sensitivity, the shutter speed, the diaphragm aperture, and the like of the image capturing element 14, and sends instructions to respective sections.

The focus detection sensor 22 detects the defocus amount from the image of the object formed by the optical system of the lens unit, and focuses the lens unit. During this process, the focus detection sensor 22 acquires information related to the distance from the image capturing element 14 to the object, too.

To the connecting section 40, the AV cable 110, the communication cable 120, the connecting section included in the wireless appliance 100, and the connection section included in the peripheral appliance 140 are connected. The connecting section 40 includes a connecting terminal and a power-supply terminal to be connected to the connecting appliance. The concrete examples of the connecting terminal and the power-supply terminal are detailed later.

The input section 24 receives an operation of a user through a release button, a dial, a ten key, a push button, or the like, and holds the inputted instruction, the set value, or the like. The CPU 12 determines the operation condition by referring to the input section 24. The battery 80 supplies power to each section of the image capturing apparatus 10.

The ASIC 26 outputs information such as image data to the connecting appliance connected to the connecting section 40. The ASIC 26 also receives information such as image data from the connecting appliance connected to the connecting section 40.

The data input/output section 230 outputs the data to the connecting appliance through the connecting section 40. In addition, the data input/output section 230 receives data from the connecting appliance. In addition, the outside output section 280 outputs the data inputted by the CPU 12, to the connecting appliance using a method different from the method adopted by the data input/output section 230. For example, the data input/output section 230 outputs the data to the connecting appliance, as a digital signal, and the outside output section 280 outputs the data to the connecting appliance, as an analog signal.

The connection detection section 240 detects the potential of the connecting terminal of the connecting section 40. The power-supply control section 210 and the power-supply switch section 30 start power supply via the power-supply terminal, when detecting the change in potential of the connecting terminal. For example, the power-supply control section 210 and the power-supply switch section 30 start supplying power via the power-supply terminal, when the voltage of the connecting terminal has lowered down to a predetermined threshold value or below. Specifically, the power-supply switch section 30 supplies power to the power-supply terminal from the battery driving the image capturing apparatus 10, in accordance with the control performed by the power-supply control section 210. The power-supply control section 210 and the power-supply switch section 30 function as a power source control section that starts power supply via the power-supply terminal.

The output control section 290 recognizes the type of a connecting appliance based on the result of detecting the potential of the connecting terminal after the power supply start. Specifically, the output control section 290 recognizes the type of a connecting appliance based on the potential of the connecting appliance detected by the connection detecting section 240. Specifically, the type of a connecting appliance is recognized based on the result of detecting the potential of the connecting appliance during a predetermined period of time after the power supply start. Note that the output control section 290 will control the power-supply control section 210 to stop the power supply, if the potential of the connecting terminal has changed to the first potential level from the second potential level, after the elapse of the predetermined period of time.

More specifically, the potential of a connecting terminal is initially at the first potential level when the connecting terminal is not in connection. When the potential of the connecting terminal has changed to the second potential level, the output control section 290 starts supplying power to the connecting appliance. Then, the output control section 290 recognizes that a first type connecting appliance is connected when the potential of the connecting terminal changed to the first potential level within a predetermined period of time and changed to the second potential level after the predetermined period of time, and recognizes that a second type connecting appliance is connected when the potential of the connecting terminal has not changed to the first potential level during the predetermined period of time.

If the connecting appliance complies with the USB, the connecting section 40 includes a USB connecting section to which both of the device and the host can be connected. For example, the connecting section 40 may be a Mini-AB receptacle or a micro-AB receptacle in the USB 2.0 standard. An example of the first type connecting appliance is an appliance that is required to receive power supply from the image capturing apparatus 10 and performs communication as a host. An example of the second type connecting appliance is an appliance that functions as a device. The appliance that functions as a device is defined to require power supply from the image capturing apparatus 10, as well as performing communication as a device.

As the connecting terminal, an ID terminal of a Mini-AB receptacle or a micro-AB receptacle can be used. In this case, when the connecting appliance is not connected, the potential of the connecting terminal is in an H level which is higher than the ground potential. The H level is only an example of the first potential level. The power-supply control section 210 as well as the power-supply switch section 30 start supplying power to the connecting appliance, when the potential of the connecting terminal has been switched to an L level being an example of the second potential level. The output control section 290 recognizes a connecting appliance to be a host and require power supply from outside if the potential of the connecting terminal has changed to the H level from the L level within a predetermined period of time. On the other hand, if the potential of the connecting terminal has not changed to the H level from the L level within a predetermined period of time, the output control section 290 recognizes the connecting appliance to perform communication as a device and also require power supply from outside. In other words, the output control section 290 recognizes the connecting appliance to operate as a normal device. In this way, the connecting terminal can function as a terminal that can at least recognize whether the connecting appliance is a device or not. The output control section 290 controls the data input/output section 230 to perform as a device in communicating with the connecting appliance, when the potential of the connecting terminal has changed to the H level from the L level within a predetermined period of time, and to act as a host in communicating with the connecting appliance if the potential of the connecting terminal has not changed to the H level from the L level within a predetermined period of time. In a concrete example, the data input/output section 230 transmits an image captured by the image capturing element 14 to the connecting appliance as image data, under control by the output control section 290.

Here, a host is an appliance that has an exclusive usage right of the bus. A device, meanwhile, can transmit data on condition that it has obtained the usage right of the bus from the host. Therefore, in a case where the connecting appliance can perform communication as a host, the image capturing apparatus 10 transmits the image data in response to the request from the connecting appliance. When on the contrary the connecting appliance engages in communication as a device, the image capturing apparatus 10 announces, to the connecting appliance, transmission of the image data to the connecting appliance. That is, the output control section 290 recognizes whether to transmit the image data in response to the request from the connecting appliance, based on the result of detecting the potential of the connecting terminal after the power supply start. When it is confirmed that the image data should be transmitted in response to the request from the connecting appliance, the data input/output section 230 performs the transmission in response to the request from the connecting appliance. On the other hand, when it is confirmed that the image data should not be transmitted in response to the request from the connecting appliance, the data input/output section 230 announces transmission of the image data, to the connecting appliance.

Note that the host will perform poling processing to inquire whether the device will request the processing, at predetermined intervals. The transmission of the data from a host to a device can be performed by broadcasting. The device processes the data if the judgment as to whether the data is destined to the device itself is in the affirmative.

The power supply detecting section 220 detects the potential of the power-supply terminal included in the connecting section 40. When the potential of the connecting terminal has not changed but the potential of the power-supply terminal has changed, the output control section 290 recognizes that the image data should be transmitted to the device in a method different from the method adopted for the first type connecting appliance. To be more specific, when the potential of the connecting terminal (ID terminal) has not changed but the potential of the power-supply terminal has changed, the connecting appliance in question is recognized by the output control section 290 to be a device that is to function as a host. In this case, the output control section 290 controls the data input/output section 230 to act as a device in communicating with the connecting appliance. The ASIC 26 also controls each section to operate with the power supplied from the power-supply terminal. Note that one example of the third type connecting appliance that can be recognized by the output control section 290 is an appliance that functions as such a host. The third type connecting appliance may be an appliance that does not require power supply.

The excess current detecting section 270 detects whether the current supplied to the connecting appliance exceeds a predetermined value. Specifically, the excess current detecting section 270 receives, from the power-supply switch section 30, a signal indicating occurrence of excess current. When determining that the current supplied to the connecting appliance exceeds a predetermined value, the power-supply control section 210 controls the power-supply switch section 30 to stop power supply to the connecting appliance.

The outside output section 280 outputs the image data in the form of an analog signal, to outside. More specifically, the outside output section 280 outputs an analog AV signal to outside. When it is determined that the connecting appliance needs to receive an output in the form of an analog signal, the output control section 290 controls the outside output section 280 to output an analog signal to the connecting appliance. For example, when it is detected that the AV cable 110 has been connected to the connecting section 40, the output control section 290 will control the outside output section 280 to output an analog AV signal to the connecting appliance.

Figure 3:
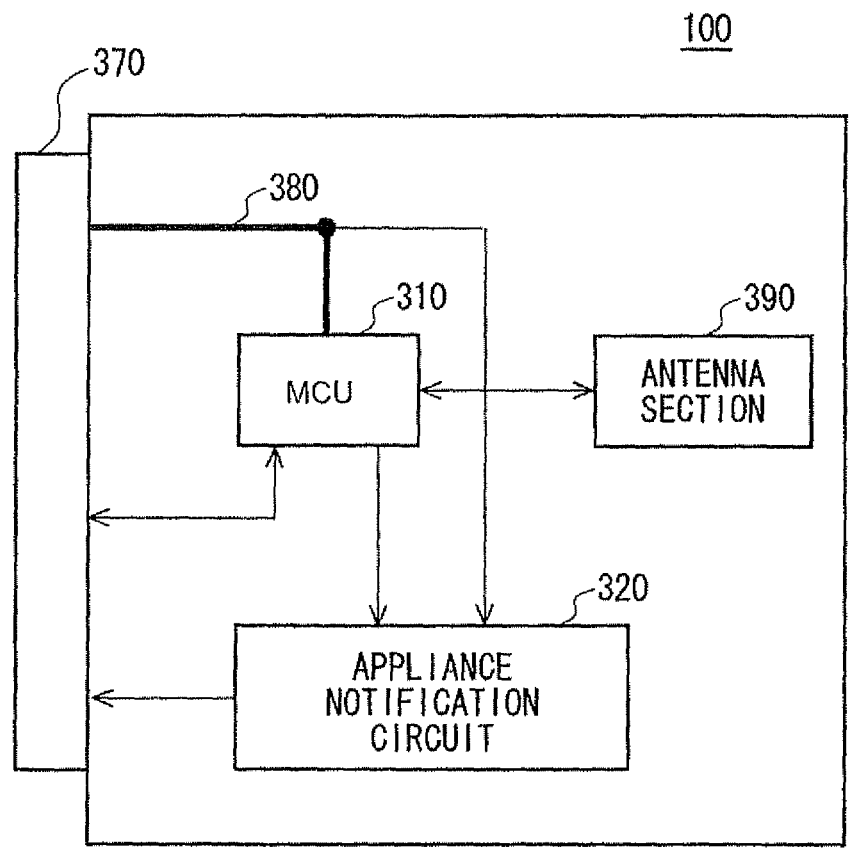
FIG. 3 shows an example of the block configuration of a wireless appliance 100.

FIG. 3 shows an example of the block configuration of a wireless appliance 100. The wireless appliance 100 includes an MCU 310 being a micro control unit, an antenna section 390, an appliance notification circuit 320, and a connecting section 370. The MCU 310 receives power from the electronic appliance connected to the MCU 310 through the power-supply line 380 connected to the connecting section 370.

The connecting section 370 includes a power-supply terminal and a connected terminal electrically connected to the connecting terminal of the image capturing apparatus 10. When the connected terminal is electrically connected with the connecting terminal, The appliance notification section 320 changes the potential of the connected terminal to the second potential level from the first potential level, and changes the potential of the connected terminal from the second potential level to the first potential level when the power starts to be supplied from the electronic appliance via the power-supply terminal. Specifically, the appliance notification section 320 changes the potential of the connected terminal to the first potential level from the second potential level, when it has started to receive power from the electronic appliance via the power-supply terminal. For example, the appliance notification circuit 320 changes the potential level of the connected terminal from the second potential level to the first potential level, using the power supply as its trigger. As a result, the image capturing apparatus 10 can detect that the wireless appliance 100 is the first type connecting appliance. Note that concrete examples of the appliance notification circuit 320 are detailed with reference to FIG. 4 and the like.

After changing the potential of the connected terminal from the first potential level to the second potential level, the MCU 310 starts communication with the electronic appliance. Specifically, the MCU 310 communicates with the image capturing apparatus 10 as a host, and operates using power supplied via the power-supply line 380. In other words, the MCU 310 functions as a USB host controller in communicating with the image capturing apparatus 10. Specifically, the MCU 310 transmits, to the image capturing apparatus 10, a signal received at the antenna section 390, via the data terminal of the connecting section 370.

Figure 4:
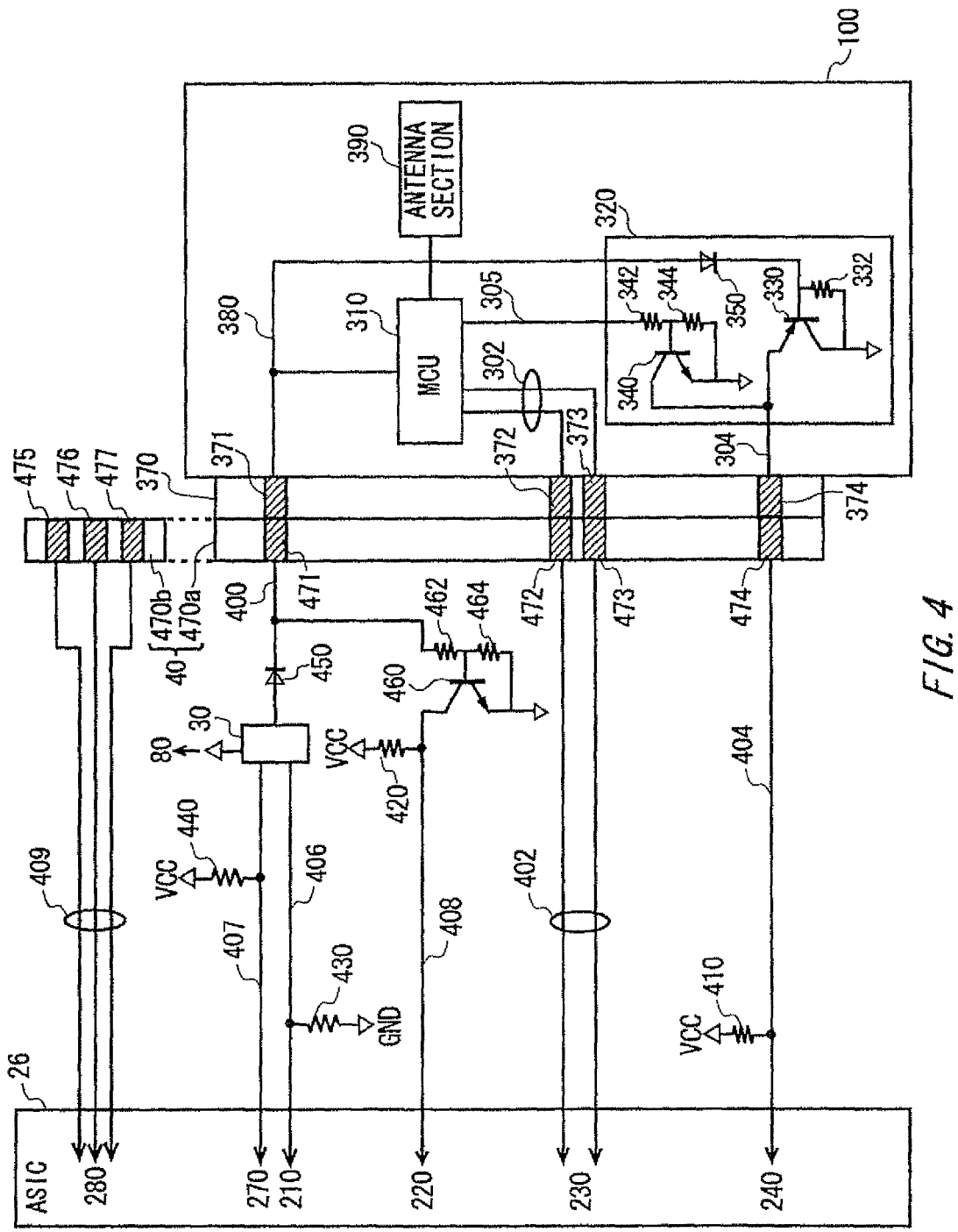
FIG. 4 schematically shows the state in which the image capturing apparatus 10 and the wireless appliance 100 are connected to each other.

FIG. 4 schematically shows the state in which the image capturing apparatus 10 and the wireless appliance 100 are connected to each other. In the example of this drawing, the connecting section 40 includes a connecting section 470a and a connecting section 470b. A connecting appliance including a connecting section (USB terminal) is connected to the connecting section 470a. An AV cable 110 is connected to the connecting section 470b. This drawing does not show the ground terminal included in the connecting section 370 and the connecting section 470, or the shield terminal included in the connecting section 370.

The connecting section 470b includes a video output terminal 475 for outputting a video signal, an audio L terminal 476 for outputting an audio signal of Lch, and an audio R terminal 477 for outputting an audio signal of Rch. The outside output section 280 includes the video output terminal 475, the audio L terminal 476, and the audio R terminal 477, through the outside output line 409. Although not shown in this drawing, when the AU cable 110 is connected to the connecting section 470b, the video input terminal, the audio L terminal, and the audio R terminal included in the AV cable 110 are respectively brought into contact with the video output terminal 475, the audio L terminal 476, and the audio R terminal 477.

For example, the connecting section 470a may be a Mini-AB receptacle or a micro-AB receptacle in the USB 2.0 standard. The connecting section 470a includes a VBUS terminal 471, a D−terminal 472, a D+terminal 473, and an ID terminal 474.

The ID terminal 474, which is an example of the connecting terminal, is connected to a detecting line 404. The potential of the detecting line 404 is inputted to the ASIC 26. The detecting line 404 is pulled up by the resistance 410 and the VCC power source being an example of the voltage applying section. In this way, the ID terminal 474 is pulled up, by being provided with a predetermined voltage. In the ASIC 26, the connection detecting section 240 detects the potential of the detecting line 404.

The D−terminal 472 and the D+terminal 473, which are exemplary data terminals, are connected to the ASIC 26 via the data line 402. The connection detecting section 240 inputs and outputs data via the data line 402.

The VBUS terminal 471 is connected to the power-supply switch section 30 via the diode 450. The power-supply switch section 30 is a USB power switch, and connects the power line from the battery 80 to the power-supply line 400, in response to the instruction from the ASIC 26. The power-supply switch section 30 is connected to the ASIC 26 via the power-supply control line 406. The power-supply control line 406 is pulled down via the resistance 430. The power-supply control section 210 instructs the power-supply switch section 30 to supply power via the VBUS terminal 471, by setting the potential level of the power-supply control line 406 to the H level. The power-supply switch section 30 connects the power line from the battery 80 to the power-supply line 400, when the power-supply control line 406 has reached the H level. When the power-supply control line 406 has reached the H level, the power-supply switch section 30 supplies power from the battery 80 to the connecting appliance via the power-supply line 400 and the VBUS terminal 471.

The power-supply switch section 30 is connected to the ASIC 26 via the excess current notification line 407 pulled up at the resistance 440. The power-supply switch section 30 brings the potential of the excess current notification line 407 to the L level, when any excess current to the power-supply line 400 from the battery 80 has been detected. The excess current detecting section 270 detects an excess current by detecting the potential of the excess current notification line 407. When the excess current detecting section 270 has detected the change of the potential of the excess current notification line 407 to the L level, the power-supply control section 210 stops power supply to the power-supply switch section 30, by bringing the potential of the power-supply control line 406 to the L level.

The power-supply line 400 is connected to the base terminal of the transistor 460 via the resistance 462. The base terminal of the transistor 460 is grounded via the resistance 464. The collector terminal of the transistor 460 is connected to the power-supply detecting line 408 pulled up at the resistance 420. When power supply is performed via the power-supply line 400, the transistor 460 is set ON by the voltage at the power-supply line 400, to bring the potential of the power-supply detecting line 408 to the L level. The power-supply detecting section 220 detects the power supply via the power-supply line 400, by detecting the potential of the power-supply detecting line 408.

The connecting section 370 of the wireless appliance 100 includes a VBUS terminal 371, a D−terminal 372, a D+terminal 373, and an ID terminal 374. The ID terminal 374 is an example of the connected terminal. When connected to the connecting section 40 of the image capturing apparatus 10, the VBUS terminal 371, the D−terminal 372, the D+terminal 373, and the ID terminal 374 are respectively brought into contact with the VBUS terminal 471, the D−terminal 472, the D+terminal 473, and the ID terminal 474.

In the wireless appliance 100, the MCU 310 operates with the power supplied via the power-supply line 380 connected to the VBUS terminal 371. The MCU 310 is connected to the D−terminal 372 and the D+terminal 373 via the data line 302. Therefore, the MCU 310 can communicate with the image capturing apparatus 10 via the data line 302.

The appliance notification circuit 320 includes a first transistor 330 and a second transistor 340. The first transistor 330 is a PNP transistor. The first transistor 330 performs switching operations by means of the voltage of the power-supply line 380. Specifically, the base terminal of the first transistor 330 is connected to the power-supply line 380 via the diode 350. In addition, the base terminal of the first transistor 330 is grounded via the resistance 332. The emitter terminal of the first transistor 330 is connected to the ID terminal 374 via the ID line 304, and the collector terminal of the first transistor 330 is grounded. While receiving power from the power-supply line 380, the first transistor 330 is brought OFF by the voltage of the power-supply line 380.

The second transistor 340 performs switching operations under control of the MCU 310. The second transistor 340 is an NPN transistor, and the base terminal of the second transistor 340 is connected to the control line 305 via the resistance 342. In addition, the base terminal of the second transistor 340 is grounded via the resistance 344. The collector terminal of the second transistor 340 is connected to the ID line 304, and the emitter terminal of the second transistor 340 is grounded. The second transistor 340 is brought ON when the potential of the control line 305 has reached the H level under control of the MCU 310, and causes the ID line 304 to be grounded. When a predetermined period of time has elapsed after start of power supply via the power-supply terminal, the MCU 310 controls the second transistor 340 to be ON and starts operating. In other words, the second transistor 340 functions as a second circuitry section that changes the potential of the connected terminal from the H level to the L level, when a predetermined period of time has elapsed after start of power supply via the power-supply terminal.

Figure 5:
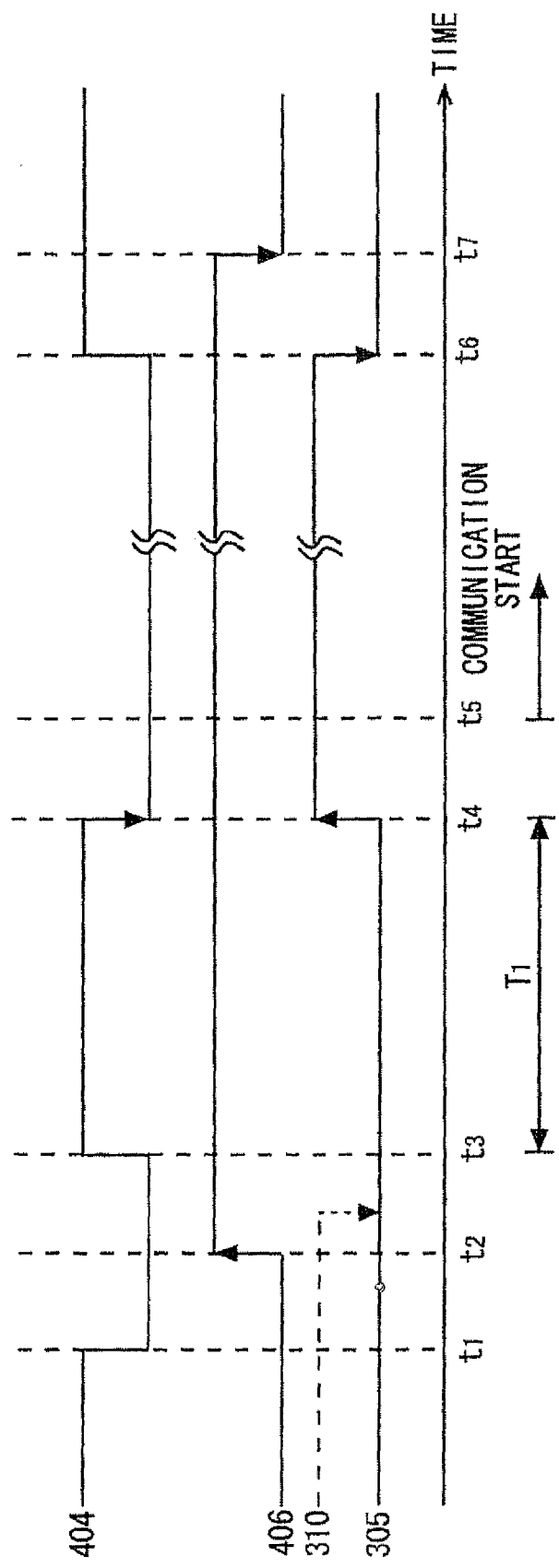
FIG. 5 shows an exemplary time sequence of each section in a case in which the wireless appliance 100 is connected to a connecting section 40.

FIG. 5 shows an exemplary time sequence of the major sections in a case in which the wireless appliance 100 is connected to a connecting section 40. When the wireless appliance 100 is not connected, the potential of the detecting line 404 is at the H level by being pulled up by the resistance 410, whereas the potential of the power-supply control line 406 is at the L level by being pulled down by the resistance 430. Moreover, inside the MCU 310, the output terminal connected to the control line 305 is in the high impedance state, whereas the control line 305 is pulled down by the resistance 342 and the resistance 344, and so its potential is at the L level.

When the wireless appliance 100 is connected to the connecting section 40, the detecting line 404 is grounded by the first transistor 330 that is in the ON state via the ID terminal 474 and the ID terminal 374. Accordingly, the potential of the detecting line 404 changes from the H level to the L level (t1). When the connection detecting section 240 has detected the change of potential at the detecting line 404, the power-supply control section 210 changes the potential of the power-supply control line 406 to the H level so as to bring the power-supply switch section 30 to the ON state (t2).

when the power-supply switch section 30 is brought to the ON state, the power line from the battery 80 is connected to the power-supply line 400, to start supplying power to the MCU 310 via the power-supply line 400, the VBUS terminal 471, the VBUS terminal 371, and the power-supply line 380. The MCU 310 starts initializing the inside when supplied with power. The MCU 310 brings the potential of the output terminal connected to the control line 305 to the L level, as part of the initialization process. Accordingly, the second transistor 340 keeps its OFF state.

Here, when the power supply starts to the power-supply line 380, and the base terminal of the first transistor 330 starts receiving voltage corresponding to the power source voltage of the power-supply line 380, the first transistor 330 is brought to the OFF state, and the potential of the detecting line 404 changes from the L level to the H level (t3).

When a predetermined period of time has elapsed after completion of the initialization, the MCU 310 changes the control line 305 to the H level (t4). This accordingly changes the potential of the detecting line 404 from the H level to the L level. In this way, by temporally setting the potential of the detecting line 404 to the H level only in the period T1 from the time t3 to the time t4, the wireless appliance 100 notifies the image capturing apparatus 10 that the wireless appliance 100 has been connected.

When the potential of the detecting line 404 has changed to the H level after the power-supply control section 210 set the power-supply control line 406 to the H level, the output control section 290 recognizes that the wireless appliance 100 has been connected. Specifically, the output control section 290 recognizes the connection of the wireless appliance 100 when the potential of the detecting line 404 has changed to the H level within a predetermined period of time after the power-supply control section 210 set the power-supply control line 406 to the H level. The predetermined period of time is determined taking into consideration the length of time required to initialize the MCU 310 and set the potential of the control line 305 to the H level after the power-supply switch section 30 started the power supply.

After detecting that the detecting line 404 has changed to the H level, the output control section 290 waits until the detecting line 404 changes to the L level. When detecting the change of the detecting line 404 to the L level (t5), the output control section 290 recognizes that the wireless appliance 100 has been connected, and controls each section of the ASIC 26 to start communication with the wireless appliance 100. Specifically, the output control section 290 controls the power-supply control section 210 to maintain power supply to the wireless appliance 100, while controlling the data input/output section 230 to act as a device in communicating with the wireless appliance 100. Specifically, the data input/output section 230 waits for arrival of a data packet from the wireless appliance 100.

When the wireless appliance 100 is detached from the connecting section 40, the detecting line 404 will be brought in the pulled-up state at the resistance 410 again, to change the potential of the detecting line 404 from the L level to the H level (t6). When the potential of the detecting line 404 is changed to the H level from the L level, the output control section 290 recognizes the detachment of the wireless appliance 100 from the connecting section 40. Then, the output control section 290 controls the power-supply control section 210 to bring the potential of the power-supply control line 406 to the L level, in an attempt to stop the power supply via the VBUS terminal 471 (t7).

Figure 6:
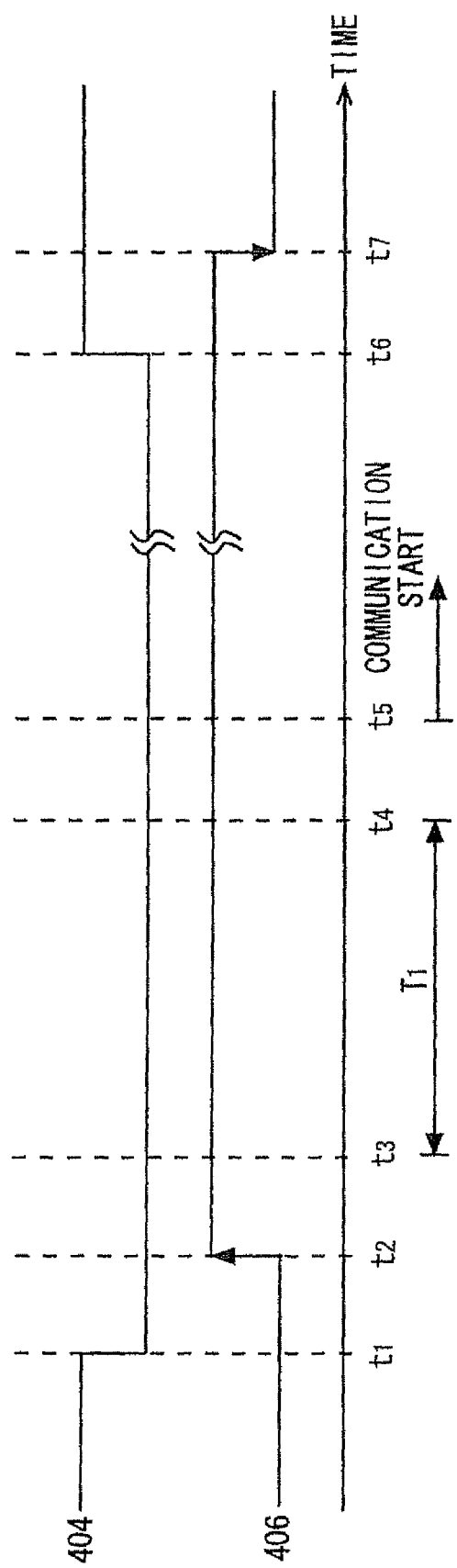
FIG. 6 shows a time sequence in a case in which the peripheral appliance 140 is connected to the connecting section 40.

FIG. 6 shows a time sequence in a case in which the peripheral appliance 140 is connected to the connecting section 40. In the USB cable connected to a device, the ID terminal is grounded. In addition, the peripheral appliance 140 does not include any circuit similar to an appliance notification circuit 320. Therefore, the following explains the potential change of the detecting line 404 and the power-supply control line 406 with reference to this time sequence. The process until the time t2 at which the power-supply switch section 30 is brought ON is not explained in the following, since the process is similar to as explained with reference to the time sequence of FIG. 5.

When the power-supply switch section 30 is brought ON, the power line from the battery 80 is connected to the power-supply line 400, and power starts to be supplied to the peripheral appliance 140 via the power-supply line 400, the VBUS terminal 471, the VBUS terminal 371, the power-supply line 380. Since the ID terminal is grounded within the USB cable, the potential of the detecting line 404 stays unchanged until the USB cable of the peripheral appliance 140 is detached from the connecting section 40.

When detecting that the potential of the detecting line 404 does not change to the H level within a predetermined period of time after the power-supply control section 210 brought the power-supply control line 406 to the H level, the output control section 290 recognizes the connection of an appliance to the connecting section 40, and so starts communicating with the peripheral appliance 140 (t5). Specifically, the output control section 290 controls each section of the ASIC 26 to function as a host. More specifically, the power-supply control section 210 is controlled to maintain the power supply to the peripheral appliance 140, and the data input/output section 230 is controlled to communicate with the peripheral appliance 140 as a host. The data input/output section 230 transmits a data packet to the peripheral appliance 140 to start communicating the peripheral appliance 140. Note that the following does not deal with the operation after the time t6 at which the peripheral appliance 140 is detached from the connecting section 40, because it is the same as explained with reference to FIG. 5.

As explained so far, just as a device such as the peripheral appliance 140, the wireless appliance 100 changes the detecting line 404 to the L level when connected to the connecting section 40, and so can receive power supply from the image capturing apparatus 10. The wireless appliance 100 temporally changes the potential of the detecting line 404 to the H level upon reception of power supply, unlike the device such as the peripheral appliance 140. Therefore, the image capturing apparatus 10 can recognize that the wireless appliance 100 is an appliance that functions as a host in data communication while receiving power supply. As a result, the image capturing apparatus 10 can quickly recognize the wireless appliance 100 and start communication without negotiating with the wireless appliance 100. In addition, the MCU 310 only has to include the function of the host controller to conduct communication as a host. No negotiation function is required to be implemented in either the MCU 310 or the image capturing apparatus 10.

Figure 7:
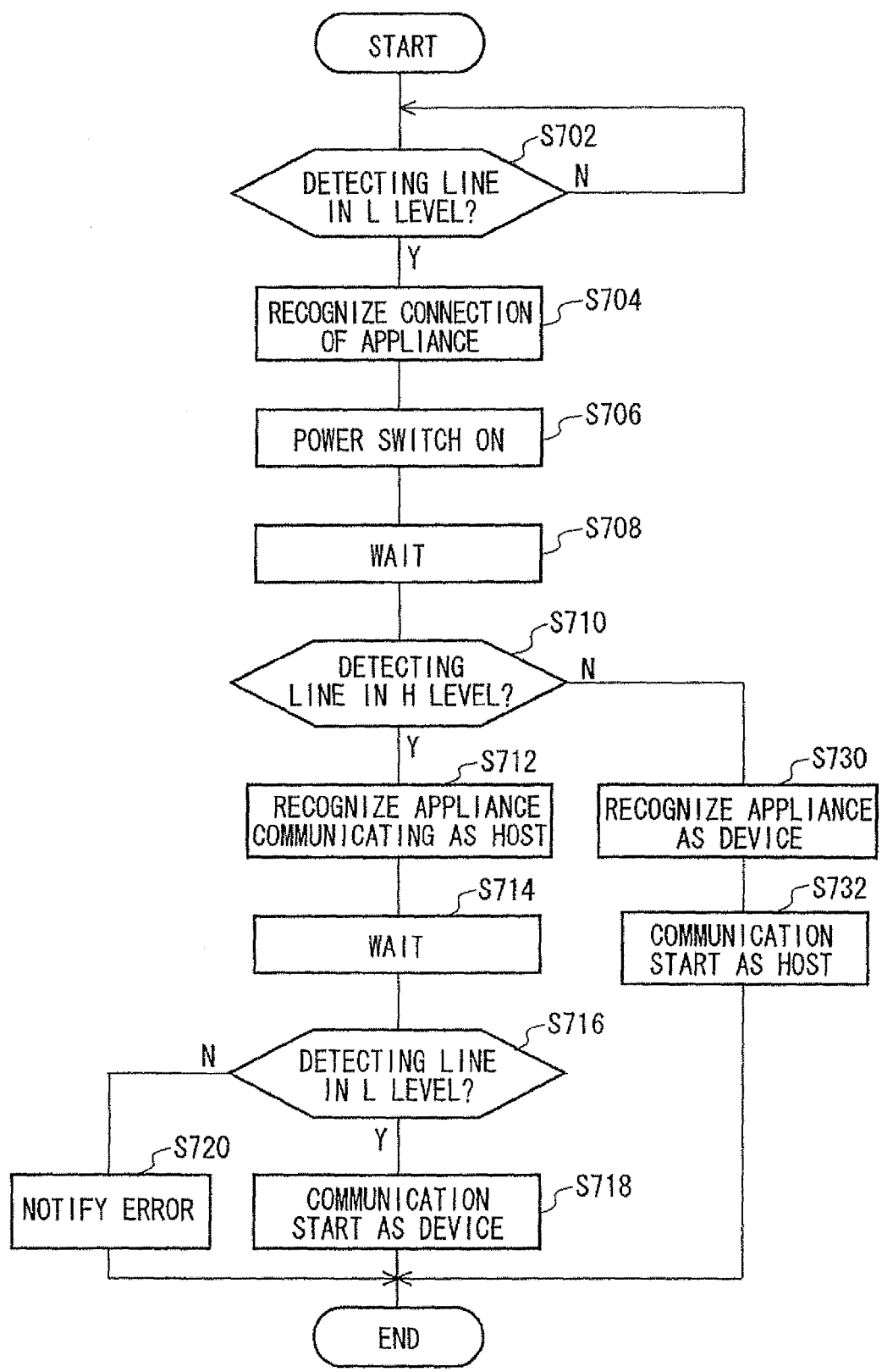
FIG. 7 shows a flow of a process in which a connecting appliance is detected and until the communication starts.

FIG. 7 shows a flow of a process in which a connecting appliance is detected and until the communication starts. Specifically, the flow is the process flow for recognizing a connecting appliance that will act as a device and starting communication. The present flow is started when it is judged that no connecting appliance is connected to the connecting section 40.

In Step S702, the output control section 290 judges whether the detecting line 404 has changed to the L level. When the detecting line 404 has changed to the L level, the processing proceeds to Step S704. When the detecting line 404 is in the L level, the judgment of Step S702 is repeated.

In Step S704, the output control section 290 judges that a connecting appliance to communicate as a device is connected, and so switches ON the power-supply switch section 30 which is a USB power switch, in Step S706.

In Step S708, the control waits for a predetermined period of time. This period is determined taking into consideration the period of time required to apply the power source voltage to the base terminal of the first transistor 330 via the power-supply line 400 and the power-supply line 380 after the power-supply switch 30 is set ON.

In Step S710, the output control section 290 determines whether the detecting line 404 is in the H level. When the detecting line 404 is in the H level, it is determined that a connecting appliance acting as a host in communication is connected to the connecting section 40, and the control waits for a predetermined period of time (Step S714). This period is determined taking into consideration the length of time required to switch ON the second transistor 340. It is desirable to wait for a sufficient amount of time, taking into consideration the individual case error in period of time required to switch ON the second transistor 340, or the like.

In Step S716, it is judged whether the detecting line 404 is in the L level. When the detecting line 404 is in the L level, the output control section 290 controls the data input/output section 230 to start communicating as a device, and the process is ended. When the detecting line 404 is not determined to be in the L level in Step S716, the output control section 290 notifies an error, without starting communication via the connecting section 40. For example, the ASIC 26 may notify the CPU 12 to display an error message to the display section 18.

When the detecting line 404 is determined not to be in the H level in Step S710, the output control section 290 recognizes that a device is connected to the connecting section 40 in Step S730. Next, in Step S732, the output control section 290 controls the data input/output section 230 to start communicating as a host, and the process is ended. The power supply is continued using the VBUS terminal 471. In other words, the image capturing apparatus 10 operates as a host, and the connecting appliance connected to the connecting section 40 operates as a device.

This flow was explained such that an error is notified when the detecting line 404 is not in the L level in Step S716 and Step S720. However, it is also possible that the image capturing apparatus 10 starts communication as a device without notifying an error. The output control section 290 may judge whether the connecting appliance is detached from the connecting section 40, based on the amount of power supply from the power-supply switch section 30 to the power-supply line 400. For example, when the amount of power supply from the power-supply switch section 30 to the power-supply line 400 falls below a predetermined value, the connecting appliance can be judged to have been detached from the connecting section 40.

As explained so far, the output control section 290 determines whether a connecting appliance is the first type connecting appliance to which image data should be transmitted, based on the result of detecting the potential of the ID terminal 474 after the power supply start. Specifically, the output control section 290 determines whether the connecting appliance is the wireless appliance 100. When it is determined that the connecting appliance is an appliance to which image data is to be transmitted via wireless communication, the data input/output section 230 transmits the image data to the connecting appliance.

Figure 8:
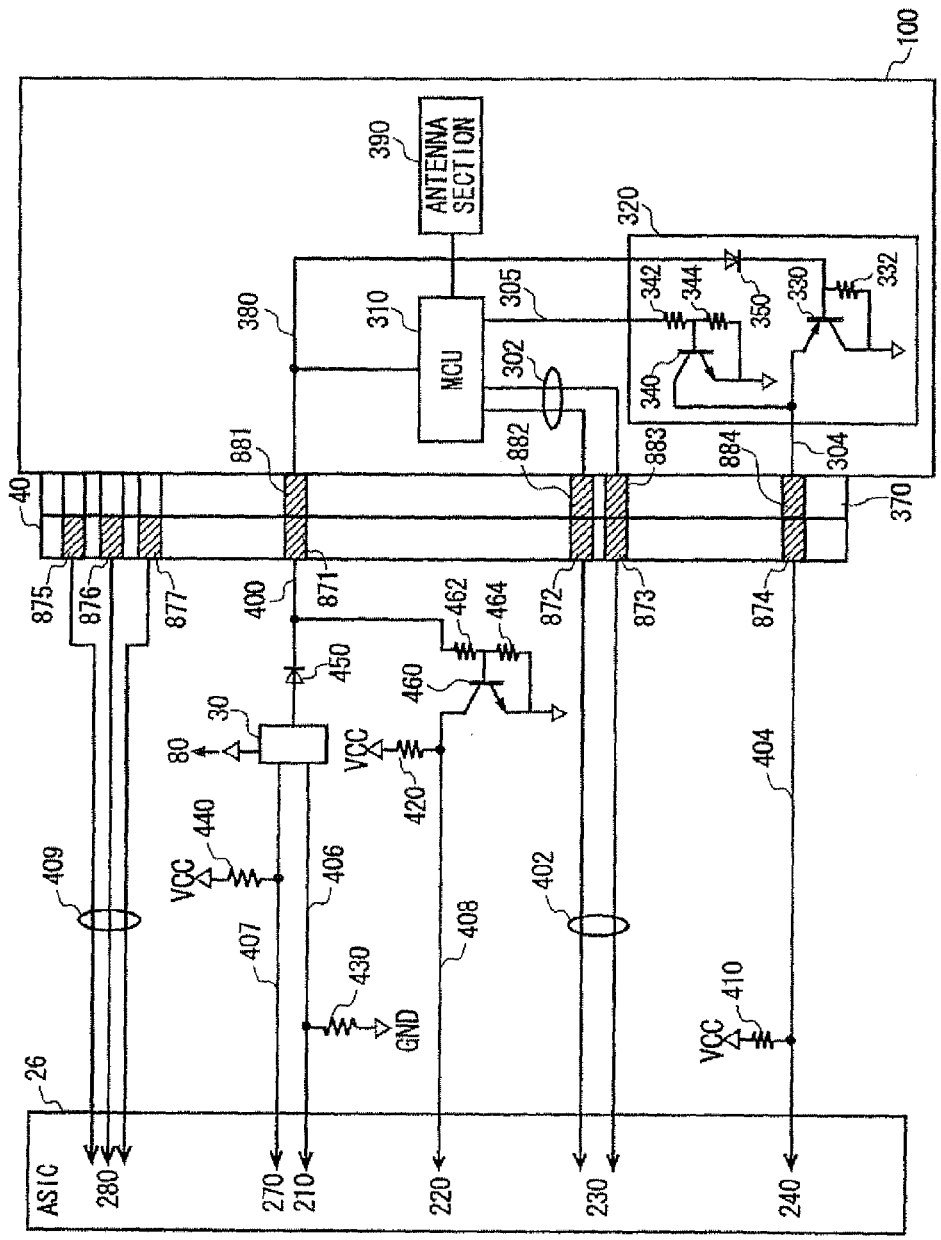
FIG. 8 schematically shows a modification example of the connecting section 40.

FIG. 8 schematically shows a modification example of the connecting section 40. In this modification example, the connecting section 40 is a composite connector that can be connected to the AV cable and the wireless appliance 100. The connecting section 40 and the connecting section 370 are equipped with connecting terminals arranged differently than in FIG. 4. Note that the reference numerals in this drawing that are common to the counterparts in FIG. 4 have the similar function and operation.

The connecting section 40 includes a VBUS terminal 871, a D−terminal 872, a D+terminal 873, a detecting terminal 874, a video output terminal 875, an audio L terminal 876, and an audio R terminal 877. This drawing schematically shows the state in which the wireless appliance 100 is connected. The video output terminal 875, the audio L terminal 876, and the audio R terminal 877 respectively correspond to the video output terminal 475, the audio L terminal 476, and the audio R terminal 477 explained with reference to FIG. 4. These AV terminals are used when the AV cable 110 is connected to the connecting section 40. The state in which the AV cable 110 is connected to the connecting section 40 is explained with reference to FIG. 9.

The connecting section 370 included in the wireless appliance 100 is shaped to allows connection to the connecting section 40 according to this modification example. The connecting section 370 includes a VBUS terminal 881, a D−terminal 882, a D+terminal 883, and an ID terminal 884. When the connecting section 370 is connected to the connecting section 40, the VBUS terminal 881, the D−terminal 882, the D+terminal 883, and the ID terminal 884 are respectively brought into contact with the VBUS terminal 871, the D−terminal 872, the D+terminal 873, and the detecting terminal 874. When the wireless appliance 100 is connected to the connecting section 40, the detecting terminal 874 will function just as the ID terminal 474 explained with reference to FIG. 4. The D−terminal 872 and the D+terminal 873 also function just as the D−terminal 472 and the D+terminal 473, and the VBUS terminal 871 functions just as the VBUS terminal 471.

The VBUS terminal 881, the D−terminal 882, the D+terminal 883, and the ID terminal 884 included in the wireless appliance 100 respectively function just as the VBUS terminal 371, the D−terminal 372, the D+terminal 373, and the ID terminal 374 respectively explained with reference to FIG. 4 through FIG. 7. Therefore, in this modification example, too, when the wireless appliance 100 is connected to the connecting section 40, the image capturing apparatus 10 and the wireless appliance 100 operate according to the time sequence similar to the time sequence explained with reference to FIG. 5. When a peripheral appliance 140 is connected to the connecting section 40, the image capturing apparatus 10 operates according to the time sequence similar to the time sequence explained with reference to FIG. 6.

Figure 9:
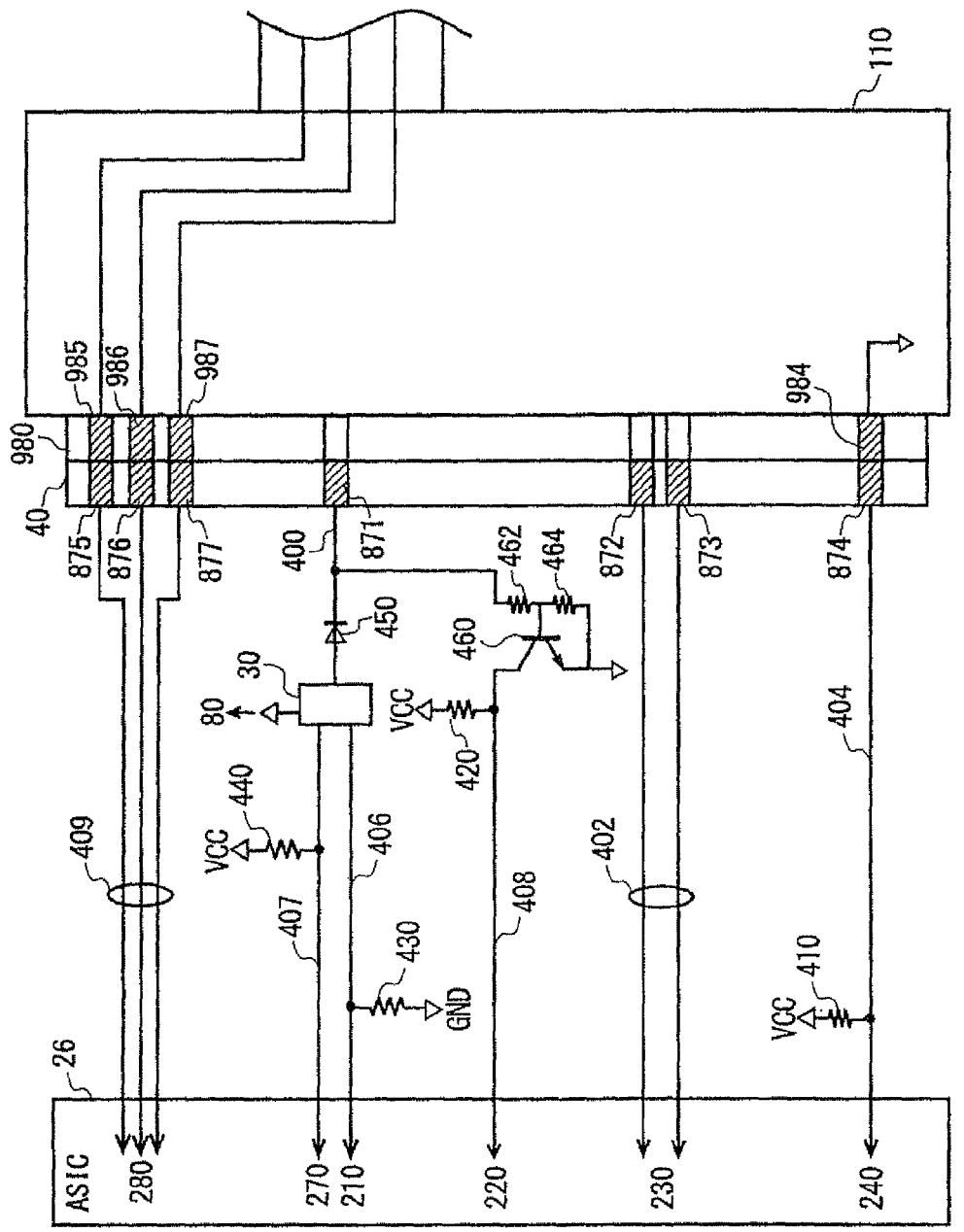
FIG. 9 schematically shows the state in which an AV cable 110 is connected to the connecting section 40.

FIG. 9 schematically shows the state in which an AV cable 110 is connected to the connecting section 40. The AV cable 110 includes a connecting section 980 shaped to allow connection to the connecting section 40. The connecting section 980 includes a video output terminal 985, an audio L terminal 986, and an audio R terminal 987. When the connecting section 980 is connected to the connecting section 40, the video output terminal 985, the audio L terminal 986, the audio R terminal 987, and the detecting terminal 874 are respectively brought into contact with the video output terminal 875, the audio L terminal 876, the audio R terminal 877, and the detecting terminal 984.

The video output terminal 985, the audio L terminal 986, and the audio R terminal 987 are connected to a television 160 or the like via the AV signal line provided inside the cable section of the AV cable 110. Therefore, when the AV cable 110 is connected to the connecting section 40, the AV signal outputted from the outside output section 280 will be outputted to the TV 160 via the AV cable 110.

On the other hand, the detecting terminal 984 is grounded within the connector section of the AV cable 110, for example. Therefore, when the AV cable 110 is connected to the connecting section 40, the potential of the detecting line 404 will change to the L level just as in the case in which the wireless appliance 100 is connected to the connecting section 40. Consequently, the output control section 290 can recognize that either the AV cable 110 or the wireless appliance 100 is connected to the connecting section 40, by detecting the change in potential of the detecting line 404.

Figure 10:
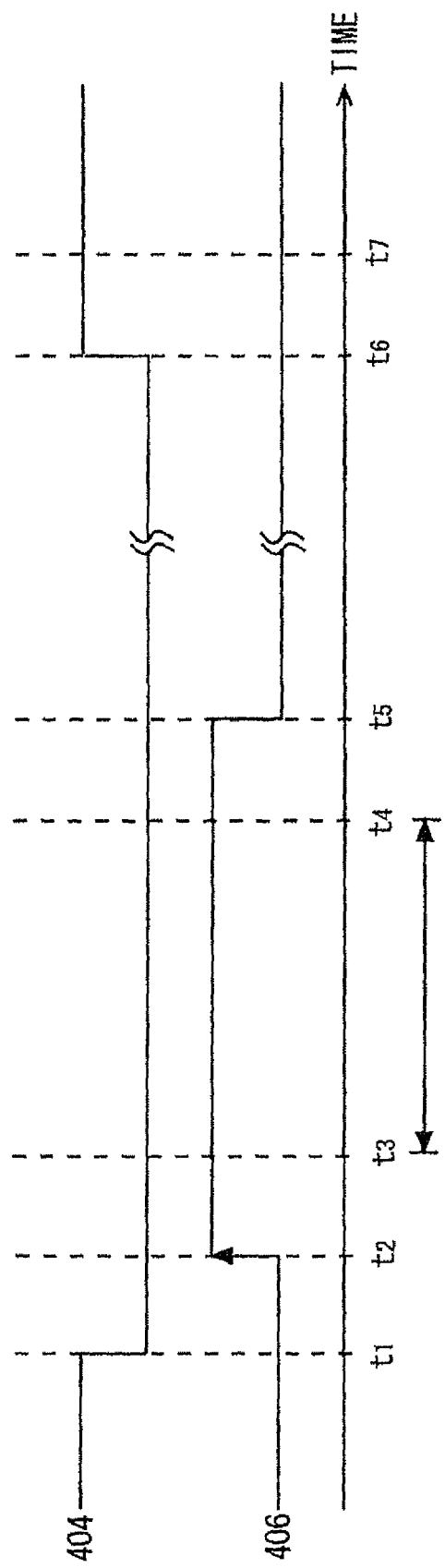
FIG. 10 shows an exemplary time sequence when the AV cable 110 is in connection.

FIG. 10 shows an exemplary time sequence when the AV cable 110 is in connection. Since the detecting terminal 984 is grounded in the AV cable 110, the potential of the detecting line 404 changes to the L level just as in the case where the wireless appliance 100 is in connection. Therefore, until the time t2 at which the power-supply switch section 30 is switched ON, the control proceeds in accordance with the similar time sequence as shown in FIG. 5.

When the power-supply switch section 30 is switched ON, the power line from the battery 80 is connected to the power-supply line 400. The AV cable 110 does not include a power-supply line for supplying power to the TV 160 via the VBUS terminal 871. For example, the AV cable 110 does not include a terminal to be in contact with the VBUS terminal 871. For this reason, no substantial power is supplied to the AV cable 110.

When detecting that the potential of the detecting line 404 does not change to the H level within a predetermined period of time after the power-supply control section 210 brought the power-supply control line 406 to the H level, the output control section 290 recognizes the connection of a device or the AV cable 110 to the connecting section 40, and so enables the outside output section 280 to transmit an AV signal to the outside output line 409 (t5). Accordingly, a user is allowed to operate the image capturing apparatus 10 and output the AV signal to an external appliance such as a TV 160. In addition, the output control section 290 controls the power-supply control section 210 to control the potential of the power-supply control line 406 to be the L level, thereby disconnecting the connection between the power line from the battery 80 to the power-supply line 400 (t5).

When the AV cable 110 is detached from the connecting section 40, the detecting line 404 is brought once again to be a pulled-up state by the resistance 410, to change the potential of the detecting line 404 to the H level from the L level (t6). The output control section 290 recognizes that the AV cable 110 has been detached from the connecting section 40, when the potential of the detecting line 404 has changed to the H level from the L level (t7).

Figure 11:
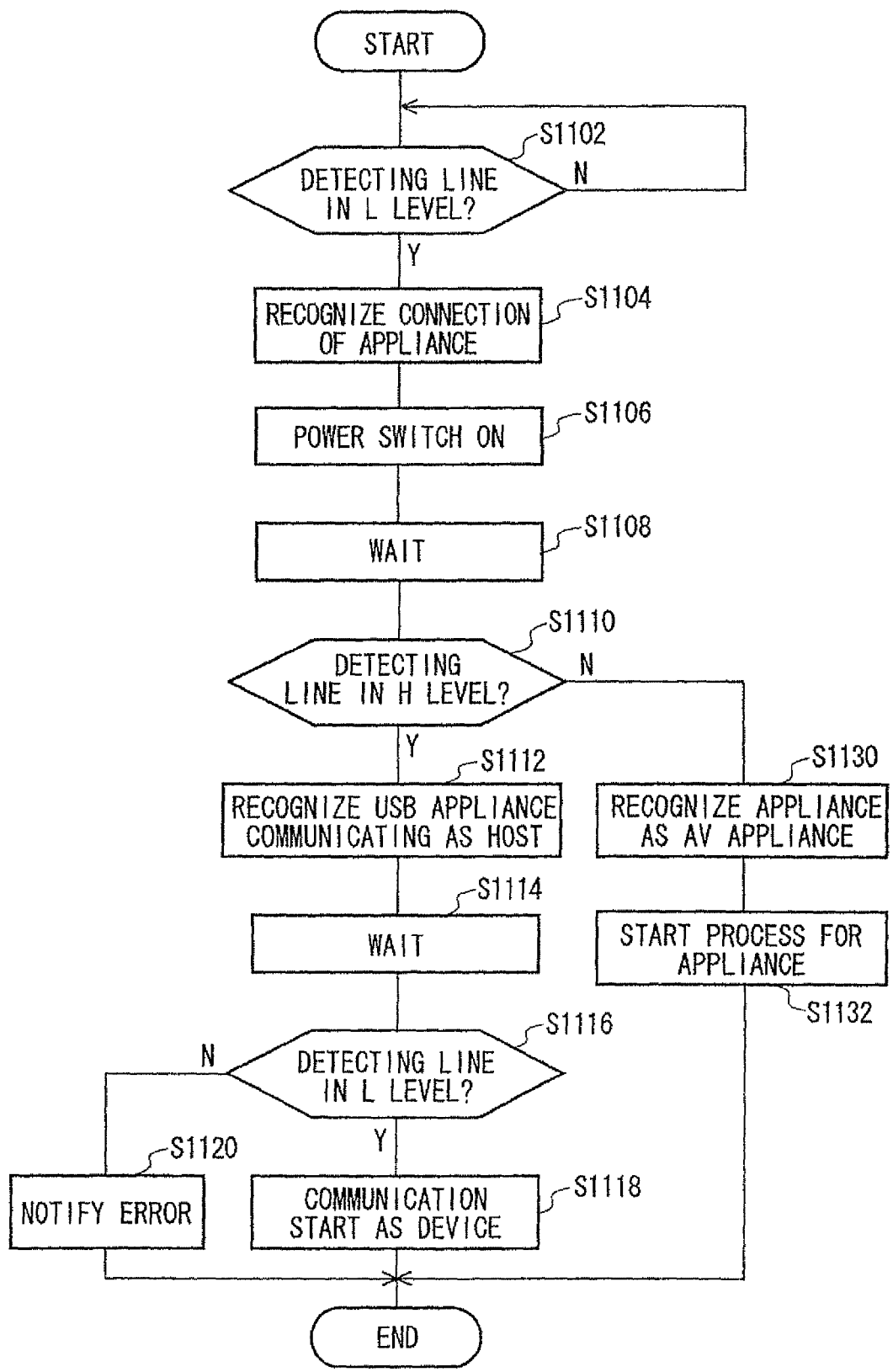
FIG. 11 shows a flow of a process in which a connecting appliance is detected and until the output starts, in the present modification example.

FIG. 11 shows a flow of a process in which a connecting appliance is detected and until the output is started, in the present modification example. In particular, this flow shows a process in which the connection of the connecting appliance communicating as a host or the AV cable 110 is conformed and the output is started. This flow starts when nothing is connected to the connecting section 40.

In Step S1102, the output control section 290 judges whether the detecting line 404 has changed to the L level. When the detecting line 1104 has changed to the L level, the process proceeds to Step S1104. When the detecting line 1104 is in the L level, the judgment of Step S1102 is repeated.

In Step S1104, the output control section 290 judges that a connecting appliance to communicate as a host or an AV cable 110 is connected, and so switches ON the power-supply switch section 30 which is a USB power switch, in Step S1106.

In Step S1108, the control waits for a predetermined period of time. This period is determined taking into consideration the period of time required to apply the power source voltage to the base terminal of the first transistor 330 via the power-supply line 400 and the power-supply line 380 after the power-supply switch 30 is set ON.

In Step S1110, the output control section 290 determines whether the detecting line 404 is in the H level. When the detecting line 404 is in the H level, it is determined that a connecting appliance acting as a host is connected to the connecting section 40, and the control waits for a predetermined period of time (Step S1114). This period is determined taking into consideration the length of time required to switch ON the second transistor 340. It is desirable to wait for a sufficient amount of time, taking into consideration the individual case error in period of time required to switch ON the second transistor 340, or the like.

In Step S1116, it is judged whether the detecting line 404 is in the L level. When the detecting line 404 is in the L level, the output control section 290 controls the data input/output section 230 to start communicating as a device, and the process is ended. When the detecting line 404 is not determined to be in the L level in Step S1116, the output control section 290 notifies an error, without starting communication via the connecting section 40. For example, the ASIC 26 may notify the CPU 12 to display an error message to the display section 18.

When the detecting line 404 is determined not to be in the H level in Step S1110, the output control section 290 recognizes that the AV cable 110 is connected to the connecting section 40 in Step S1130. Next, in Step S1132, the ASIC 26 starts processing for the AV appliance, and the process is ended. The processing for the AV appliance may include processing to notify the CPU 12 to control the display section 18 to display a menu for outputting the AV signal to outside.

This flow was explained such that an error is notified when the detecting line 404 is not in the L level in Step S1116 and Step S1120. However, it is also possible that the image capturing apparatus 10 starts communication as a device without notifying an error. The output control section 290 may judge whether the connecting appliance is detached from the connecting section 40, based on the amount of power supply from the power-supply switch section 30 to the power-supply line 400. For example, when the amount of power supply from the power-supply switch section 30 to the power-supply line 400 falls below a predetermined value, the connecting appliance can be judged to have been detached from the connecting section 40.

As explained so far with reference to FIG. 8 through FIG. 11, the output control section 290 recognizes that an image should be sent to the connecting appliance as data, when the potential of the detecting terminal 874 has changed after the power supply start, and recognizes that the image should be sent to the connecting appliance as an analog signal, when the potential of the detecting terminal 874 has not changed after the power supply start. The outside output section 280 outputs the image data in the form of an analog signal to the connecting appliance, when it is judged that the image should be sent to the connecting appliance in the form of an analog signal, according to the control by the output control section 290.

Figure 12:
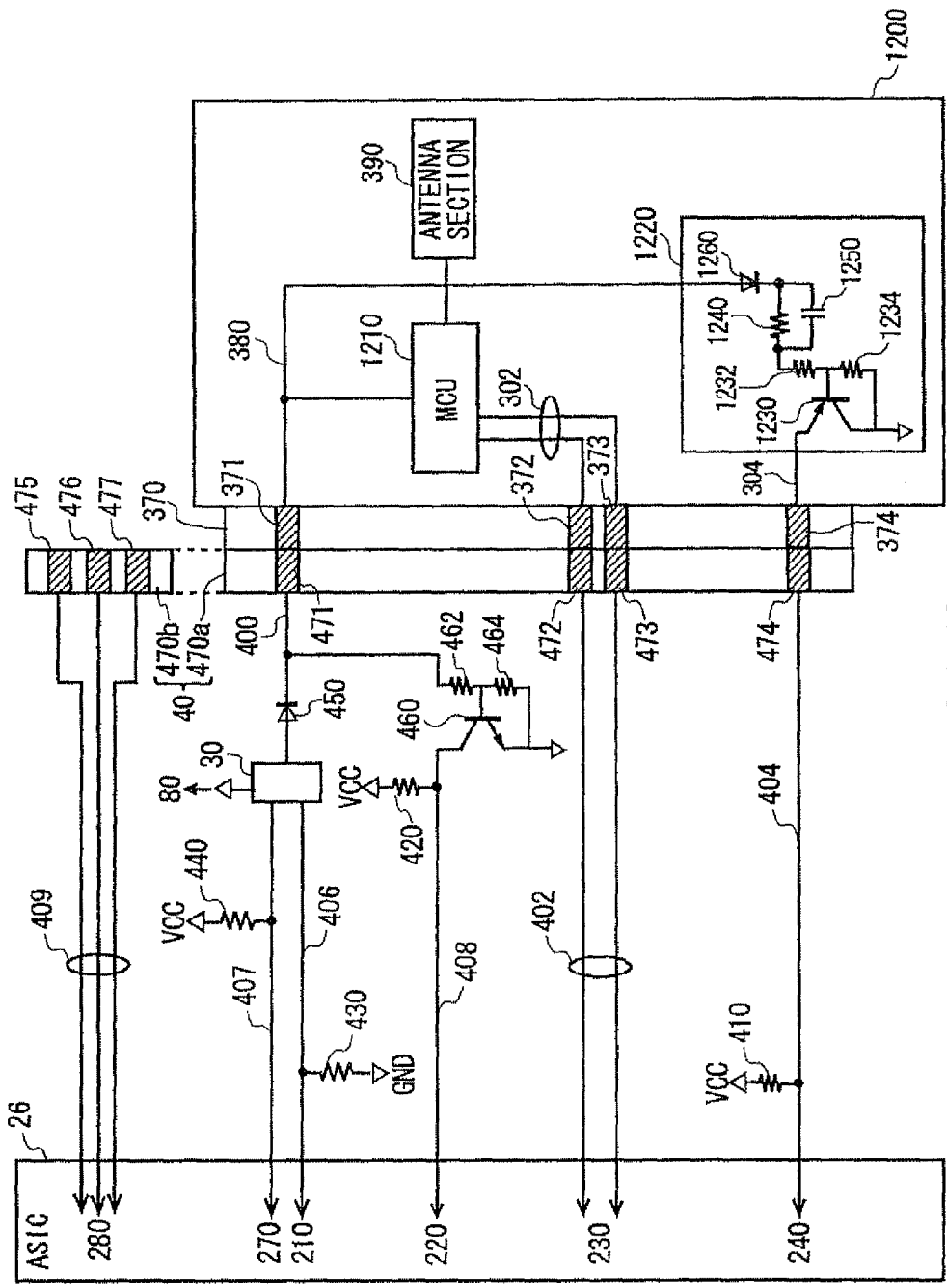
FIG. 12 shows a wireless appliance 1200 which is another example of the wireless appliance 100.

FIG. 12 shows a wireless appliance 1200 which is another example of the wireless appliance 100. The wireless appliance 1200 has a similar configuration to the configuration of the wireless appliance 100, except that it includes the appliance notification circuit 1220 which is another example of the appliance notification circuit 320, and that the MCU 1210, which is another example of the MCU 310, does not include any configuration that controls the appliance notification circuit 1220. In view of this, the following explanation of the function and operation of the wireless appliance 1200 focuses on these differences.

The appliance notification section 1220 includes a transistor 1230 for switching the ID line 304. The transistor 1230 is a PNP transistor. The base terminal of the transistor 1230 is connected to the power-supply line 380 via the diode 1260, the resistance 1240, and the resistance 1232 connected in series. The base terminal of the transistor 1230 is grounded via the resistance 1234. The emitter terminal of the transistor 1230 is connected to the ID terminal 374 via the ID line 304, and the collector terminal of the transistor 1230 is grounded. In the appliance notification circuit 1220, a capacitor 1250 is provided in parallel to the resistance 1240, for controlling the potential of the detecting line 404 to notify the image capturing apparatus 10 that it is the wireless appliance 1200.

The operation of the transistor 1230 immediately after the connecting section 370 is connected to the connecting section 40 is similar to the operation performed by the first transistor 330 already explained with reference to FIG. 5. Therefore, when the connecting section 370 is connected to the connecting section 40, the potential of the detecting line 404 changes from the H level to the L level. Here, at the moment when the power supply to the power-supply line 380 starts under control of the image capturing apparatus 10, the potential of the end of the capacitor 1250 nearer the diode 1260 changes to rise to reach the potential equivalent to the power source voltage at a comparatively fast rate. Accordingly, the other end of the capacitor 1250 undergoes change in potential equivalent to the power source voltage at a fast startup rate. As a result, the transistor 1230 is switched OFF.

As the capacitor 1250 is charged with the current from the power-supply line 380 the current flowing through the resistance 1240 increases, while the potential of the other end of the capacitor 1250 decreases. This causes to gradually decrease the potential at the base terminal of the transistor 1230. When the potential of the base terminal of the transistor 1230 decreases to reach the potential at which the transistor 1230 is switched ON, the ID line 304 gets grounded. As a result, the potential of the detecting line 404 in the image capturing apparatus 10 changes to the L level. In this way, the transistor 1230 is temporarily switched OFF by application of the power source voltage on the power-supply line 380, and then switched ON again later.

Figure 13:
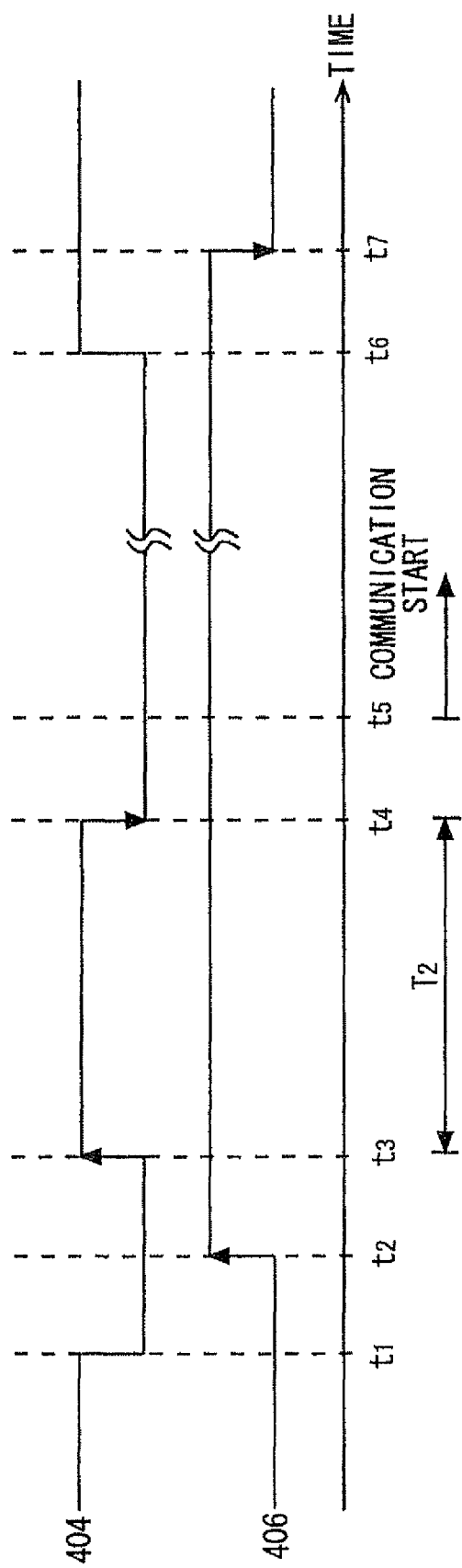
FIG. 13 shows an exemplary time sequence when the wireless appliance 1200 is connected to the connecting section 40.

FIG. 13 shows an exemplary time sequence of each section when the wireless appliance 1200 is connected to the connecting section 40. The time sequence until the time t2 at which the power-supply switch section 30 is switched ON is the same as that of FIG. 5, and so is not explained in the following.

When the power-supply switch section 30 is switched ON at the time t2, the power line from the battery 80 is connected to the power-supply line 400, and power starts being supplied to the MCU 310 via the power-supply line 400, the VBUS terminal 471, the VBUS terminal 371, and the power-supply line 380. The MCU 310 starts initialization of the internal components when it starts receiving power.

When the power-supply line 380 starts receiving power, the transistor 1230 is temporarily turned OFF as explained with reference to FIG. 12, and the potential of the detecting line 404 changes from the L level to the H level (t3). Then, as also explained with reference to FIG. 12, as the charge of the capacitor 1250 progresses, the potential of the detecting line 404 changes from the H level to the L level. In this way, by temporarily setting the potential of the detecting line 404 to the H level during the period T2 between the time t3 and t4, the wireless appliance 1200 notifies the image capturing apparatus 10 of the fact that the wireless appliance 100 has been connected.

When the potential of the detecting line 404 has changed to the H level after the power-supply control section 210 set the power-supply control line 406 to the H level, the output control section 290 recognizes the connection of the wireless appliance 100. Specifically, when the potential of the detecting line 404 has changed to the H level within a predetermined period of time after the power-supply control section 210 set the power-supply control line 406 to the H level, the output control section 290 recognizes that the wireless appliance 100 has been connected. The predetermined period of time is determined taking into consideration the length of time required for the power-supply switch section 30 to start supplying power and until the capacitor 1250 is charged to a predetermined level.

After detecting the change of the detecting line 404 to the H level, the output control section 290 waits for the detecting line 404 to change to the L level. When detecting the change of the detecting line 404 to the L level (t5), the output control section 290, recognizing that the wireless appliance 1200 is connected, starts controlling each section of the ASIC 26 in order to start communication with the wireless appliance 1200. Specifically, the output control section 290 controls the power-supply control section 210 to keep supplying power to the wireless appliance 1200, as well as controlling the data input/output section 230 to communicate with the wireless appliance 1200 as a device.

When the wireless appliance 1200 is detached from the connecting section 40, the detecting line 404 will be brought in the pulled-up state by the resistance 410 again, to change the potential of the detecting line 404 from the L level to the H level (t6). When the potential of the detecting line 404 is changed to the H level from the L level, the output control section 290 recognizes the detachment of the wireless appliance 100 from the connecting section 40, and so the output control section 290 controls the power-supply control section 210 to bring the potential of the power-supply control line 406 to the L level, in an attempt to stop the power supply via the VBUS terminal 471 (t7).

Figure 14:
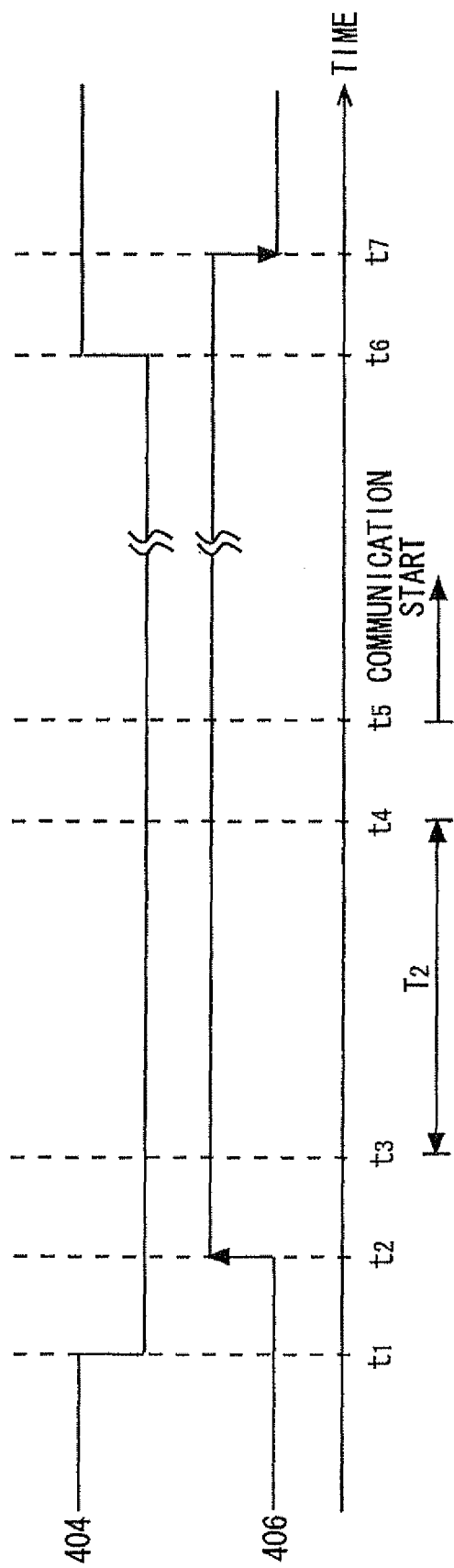
FIG. 14 shows a time sequence when the peripheral appliance 140 is connected to the connecting section 40.

FIG. 14 shows a time sequence in a case in which the peripheral appliance 140 is connected to the connecting section 40. In the USB cable connected to the device, the ID terminal is grounded. Therefore, the process until the time t2 at which the power-supply switch section 30 is brought ON is not explained in the following, since the process is similar to as explained with reference to the time sequence of FIG. 13.

When the power-supply switch section 30 is switched ON, the power line from the battery 80 is connected to the power-supply line 400, so that the peripheral appliance 140 starts receiving power via the power-supply line 400, the VBUS terminal 471, the VBUS terminal 371, and the power-supply line 380. Since the ID terminal is grounded within the USB cable, the potential of the detecting line 404 does not change until the USB cable of the peripheral appliance 140 is detached from the connecting section 40.

When detecting that the potential of the detecting line 404 does not change to the H level within a predetermined period of time after the power-supply control section 210 has brought the power-supply control line 406 to the H level, the output control section 290 starts communicating with the peripheral appliance 140, considering that a device has been connected to the connecting section 40 (t5). Specifically, the output control section 290 controls each section of the ASIC 26 to operate as a host. More specifically, the output control section 290 controls the power-supply control section 210 to keep supplying power to the peripheral appliance 140, as well as controlling the data input/output section 230 to communicate with the peripheral appliance 140 as a host. Note that the following does not explain the operation after the time t6 at which the peripheral appliance 140 is detached from the connecting section 40, since the operation is the same as shown in FIG. 13.

Note that a flow substantially the same as in FIG. 7 can be used as the process flow starting with detecting the wireless appliance 1200 and the peripheral appliance 140 and until the communication starts. For example, the same flow as shown in FIG. 7 be used, except that the waiting time at Step S708 and the waiting time at Step S714 are decided taking into consideration the response time of the switch operation for the entire wireless appliance 1200.

As explained so far, the wireless appliance 1200 changes the detecting line 404 to the L level when connected to the connecting section 40, just as the device such as the peripheral appliance 140, and so can receive power supply from the image capturing apparatus 10. Since the wireless appliance 1200, just as the wireless appliance 100, temporarily changes the potential of the detecting line 404 to the H level upon reception of power supply, the image capturing apparatus 10 can recognize that the wireless appliance 100 is an appliance that acts as a host in data communication while receiving power supply. In particular, the wireless appliance 1200 changes the potential of the detecting line 404 to the H level, temporarily and passively in response to reception of power supply. Therefore, the MCU 1210 does not have to be equipped with a function to lower the detecting line 404 down to the L level after the power supply start. This helps produce small-size wireless appliances 1200.

Also note that the modification examples explained with reference to FIG. 8 and FIG. 9 can be applied as modification examples of the connecting section 40 and the connecting section 370 explained with reference to FIG. 12. In this case, the time sequence for a case in which the wireless appliance 1200 is connected can be a time sequence similar to the one shown in FIG. 13. Likewise, the time sequence in a case where the AV cable 110 is connected can be a time sequence similar to the one shown in FIG. 10. For example, the similar time sequence is applicable except that the period of time T2 that takes into consideration the response time of the switching operation of the entire wireless appliance 1200 is used as the period of time between the time t3 to the time t4. In addition, a process flow substantially the same shown in FIG. 11 can be adopted as the process flow for detecting a connecting appliance and starting output. Specifically, the flow of FIG. 11 can be applied except that the waiting time at Step S1108 and the waiting time at Step S1114 are decided taking into consideration the response time of the switch operation for the entire wireless appliance 1200.

In the above explanation, the image capturing apparatus 10 was explained to include an ASIC 26 and a CPU 12. However, it is also possible to implement the aforementioned function of the ASIC 26 and the CPU 12 into a single processor.

The process explained in relation to the image capturing apparatus 10 of the present embodiment can be performed by each section of the image capturing apparatus 10 (e.g., processor) operating according to a program. In other words, the process can be realized by a so-called computer apparatus. The computer apparatus can load a program for controlling execution of the aforementioned processing, operate according to the read program, and execute the process. The computer apparatus can load the program by reading a computer-readable recording medium storing the program.

The image capturing apparatus 10 discussed in the present embodiment is an exemplary electronic appliance. The image capturing apparatus may be an appliance including an image capturing function, some examples of which are a single-lens reflex camera with interchangeable lenses, a compact digital camera, a mirror less single-lens camera, a video camera, a medial image apparatus, a portable telephone with an image capturing function, a handheld terminal with an image capturing function, an entertainment apparatus such as a game apparatus with an image capturing function, a scanner, and a facsimile. The electronic appliance may be an electronic image apparatus such as a television, a video, a digital photo frame, a projector apparatus, and an entertainment apparatus such as a game appliance. The electronic appliance may also be realized as an electronic audio apparatus such as a recording apparatus. Note that the electronic appliance can be implemented into a various appliances not limited to the electronic image apparatuses or the audio apparatuses.

In addition, the connecting appliance connected to the electronic appliance can be applied to a various appliances, not limited to a wireless appliance. For example, the connecting appliance can be applied to a GPS appliance, or the like.

In the above, the output control section 290 was explained to start supplying power to the connecting appliance, when the potential of the connecting terminal has changed from the first potential level to the second potential level. The above explanation also stated that the output control section 290 recognizes that the first type connecting appliance has been connected, when the potential of the connecting terminal has changed to the first potential level within a predetermined period of time, then after the predetermined period of time the potential of the connecting terminal has changed to the second potential level, and if the potential of the connecting terminal has not changed to the first potential level within the predetermined period of time, the output control section 290 recognizes that the second type connecting appliance has been connected. Here, the change in potential from the second potential level to the first potential level occurring after the power supply start, as well as the change in potential from the first potential level to the second potential level may be part of a clock signal. The output control section 290 may recognize the type of the connecting appliance based on whether the change in potential as a clock signal has occurred a predetermined number of times or more. In other words, the output control section 290 may recognize the type of the connecting appliance based on whether the clock signal has been detected a predetermined number of times or more from the connecting terminal after the power supply start. For example, the output control section 290 may recognize connection of the first type connecting appliance when the clock signal has been detected a predetermined number of times or more, and recognize connection of the second type connecting appliance when the clock signal has not been detected a predetermined number of times or more. For example, the output control section 290 may recognize that the connecting appliance is to communicate as a host, when the clock signal has been detected a predetermined number of times or more from the connecting terminal after the power supply start. When the clock signal is not detected a predetermined number of times or more after the power supply start, the output control section 290 may recognize that the connecting appliance is a device. Note that the appliance notification circuit 320 in the wireless appliance 100 may include a sending section that outputs a predetermined clock signal to the connected terminal, when there is a power supply via the power-supply terminal. After the sending section outputted the predetermined clock signal to the connected terminal, the MCU 310 may start communication with the image capturing apparatus 10. The interface system explained with reference to the drawings from FIG. 15 may be utilized as a part of the electronic appliance system that recognizes the type of the appliance based on the result of detecting a clock signal.

Note that the wireless appliance 100 is an example of the appliance that controls communication. The appliance connectable to the image capturing apparatus 10 is not limited to an appliance that conducts communication in accordance with a USB standard. Both the first appliance that controls communication and the second appliance different from the first appliance can be connected to the connecting section 40 of the image capturing apparatus 10. The output control section 290 may recognize whether the appliance connected to the connecting section 40 is the first appliance or the second appliance, based on the result of detecting the potential of the connecting terminal as explained above.

Figure 15:
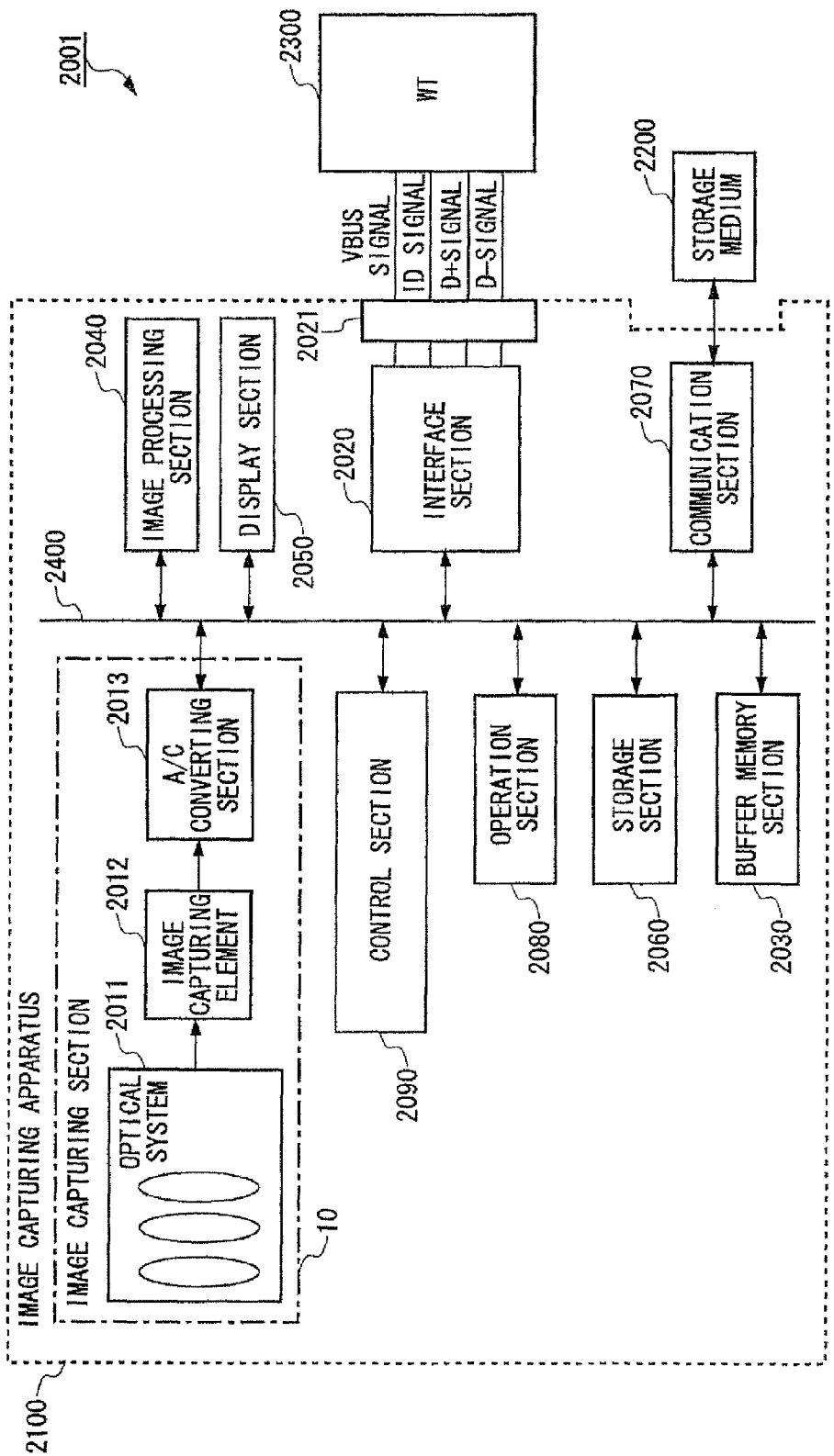
FIG. 15 is a schematic block diagram of an interface system according to the present embodiment.

The following explains an interface system, and an image capturing apparatus and a host apparatus being an example of the electronic appliance in one embodiment, with reference to the drawings. FIG. 15 is a schematic block diagram of an interface system 2001 according to the present embodiment. In this embodiment, the interface system 2001 is explained using an example of connecting the image capturing apparatus 2100 being an example of the electronic appliance with the wireless transmitter (hereinafter simply "WT") 2300. In FIG. 15, the interface system 2001 includes an image capturing apparatus 2100 and a WT 2300 connected to each other via an USB (Universal Serial Bus) interface. In the present embodiment, the image capturing apparatus 2100 and the WT 2300 are respectively an example of a first apparatus and a second apparatus connected by an interface.

The image capturing apparatus 2100 includes an image capturing section 2010, an interface section 2020, a connector 2021, a buffer memory section 2030, an image processing section 2040, a display section 2050, a storage section 2060, a communication section 2070, an operation section 2080, and a control section 2090.

The image capturing section 2010 is controlled by the control section 2090 based on the configured image capturing condition (e.g., diaphragm value, exposure value). The image capturing section 2010 forms an optical image via an optical system 2011, on an image capturing element 2012, and generates image data based on the optical image converted by an A/D (analog/digital) converting section 2013. The image capturing section 2010 includes the optical system 2011 equipped with a plurality of lenses, the image capturing element 2012, and the A/D converting section 2013. Note that the above-mentioned optical system 2011 may be integrated with the image capturing apparatus 2100, or detachably attached to the image capturing apparatus 2100.

For example, the image capturing element 2012 converts the optical image formed on the light reception surface into an electric signal (voltage signal), and supplies it to the A/D converting section 2013. The light reception surface of the image capturing element 2012 may be constituted by a plurality of image sensors arranged in a lattice formation (e.g., CCD (charge coupled device) image sensors), where each image sensor converts the formed optical image into a voltage value. The A/D converting section 2013 subjects the voltage value converted by the image capturing element 2012 to analog-digital conversion, and outputs the image data being the digital signal after the conversion.

The buffer memory section 2030 temporarily stores the image data captured by the image capturing section 2010. The image processing section 2040 performs image processing to the image data stored in the buffer memory section 2030, based on the image processing condition stored in the storage section 2060. Here, "image data" stored in the buffer memory section 2030 means image data (input image) inputted to the image processing section 2040, and some examples of it may be captured image data, through-the-lens image data, or captured image data read from the recording medium 2200.

An example of the display section 2050 is a liquid crystal display, and displays image data obtained by the image capturing section 2010, an operation screen, or the like. The storage section 2060 stores a judgment condition referred to when determining scenes by the control section 2090, image capturing conditions, etc.

The communication section 2070 is connected to a removable storage medium 2200 (e.g., card memory), and performs such operations as writing, reading, deleting of captured image data with respect to this storage medium 2200. The storage medium 2200 is a storage section detachably connected to the image capturing apparatus 2100, and may store the captured image data generated by the image capturing section 2010, for example.

The operation section 2080 includes a power source switch, a shutter button, a ten key, a decision button, a deletion button, and other types of operation keys, which, when operated by a user, accepts the operational input of the user, and supplies it to the control section 2090.

The control section 2090 includes a CPU (central processing unit) for example, and controls each component of the image capturing apparatus 2100. For example, the control section 2090 causes the storage medium 2200 to store the image data obtained via the image capturing element 2012 and the A/D converting section 2013 upon reception of an image capturing instruction via the operation section 2080, as captured image data of a captured still image. The control section 2090 further controls the interface section 2020 to control communication performed with an apparatus connected to the connector 2021 via a USB interface.

The bus 2400 is connected to the image capturing section 2010, the interface section 2020, the buffer memory section 2030, the image processing section 2040, the display section 2050, the storage section 2060, the communication section 2070, the operation section 2080, and the control section 2090, and transfers image data, control signals, or the like outputted from each section.

The interface section 2020 is connected to the WT 2300 via the connector 2021, and communicate with the WT 2300. The connector 2021 is a connector (e.g. Mini-AB receptacle) connectable regardless of whether the connected apparatus is a host or a device. The connector 2021 can be connected to any of a Mini-A plug and a Mini-B plug. The connector 2021 is connected to the WT 2300 via a VBUS signal line, an ID signal line, a D+signal line, and a D−signal line. Note that "host" here means an apparatus controlling communication, in other words, a master apparatus in communication. The term "device" indicates an apparatus whose communication is controlled, in other words, a slave apparatus in communication. In the example of FIG. 15, the image capturing apparatus 2100 is a device, and the WT 2300 is a host.

Figure 16:
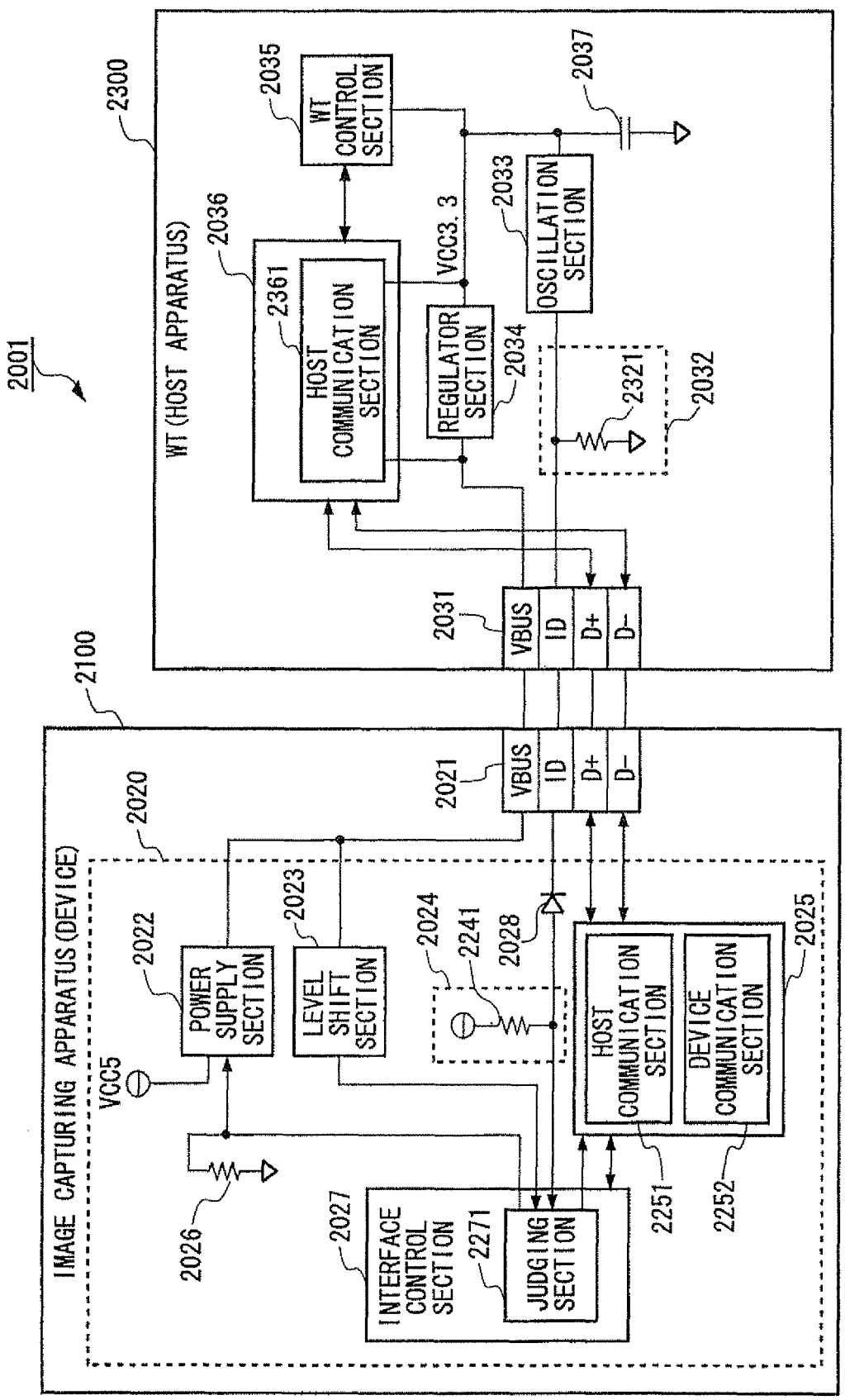
FIG. 16 is a schematic block diagram showing a part of the image capturing apparatus and the host apparatus in the same embodiment.

Next, the configuration of the interface section 2020 and the connector 2021 in the image capturing apparatus 2100 and the WT 2300 is detailed with reference to FIG. 16. FIG. 16 is a schematic block diagram showing a part of the image capturing apparatus 2100 and the host apparatus in the same embodiment. In this drawing, the image capturing apparatus 2100 is a device, and the WT 2300 is a host. In other words, in this example, the WT 2300 performs as a host while operating according to the power supplied via the VBUS terminal. The VBUS terminal is an example of the power supply terminal.

First, the configuration of the interface section 2020 and the connector 2021 in the image capturing apparatus 2100 is explained. The connector 2021 includes a VBUS terminal, an ID terminal, a D+terminal, and a D−terminal. The VBUS terminal supplies power to an apparatus connected via the USB interface. In the present embodiment, power is supplied to the WT 2300 from the image capturing apparatus 2100 via the VBUS terminal. The ID terminal receives a signal for identifying the type of the apparatus (WT 2300 in this example) connected via the USB interface. The ID terminal is an example of the identification terminal. The D+terminal and the D−terminal conducts transmission/reception of data by means of a pair of differentiation by a differential signal.

The image capturing apparatus 2100 conducts serial communication of data with the WT 2300 via the D+terminal and the D−terminal.

In this drawing, the interface section 2020 of the image capturing apparatus 2100 includes a power supply section 2022, a level shift section 2023, a voltage applying section 2024, a communication section 2025, a pull-down resistance 2026, an interface control section 2027, and a diode 2028.

The power supply section 2022 supplies power to the VBUS terminal based on the control signal (EN signal) supplied from the interface control section 2027. Specifically, the power supply section 2022 supplies power to the VBUS terminal, by conducting between the power source line VCC5 and the VBUS terminal, when the EN signal supplied from the judging section 2271 of the interface control section 2027 has become the H (high) state. When the EN signal has changed to the L (low) state, the power supply section 2022 disconnect the conduction between the power source line VCC5 and the VBUS terminal, to stop power supply to the VBUS terminal. Here, the voltage of 5V is applied to the power source line VCC5.

The level shift section 2023 level-converts the voltage on the VBUS terminal (e.g. 5 V) into the operational voltage (e.g. 3.3 V) of the interface control section 2027. In other words, when the VBUS terminal is receiving a voltage of 5 V, the level shift section 2023 outputs 3.3 V (H state) to the judging section 2271 of the interface control section 2027. When the VBUS terminal is receiving a voltage of 0 V, the level shift section 2023 outputs 0 V (L state) to the judging section 2271 of the interface control section 2027.

The voltage applying section 2024 is connected to the ID signal line connected from the interface control section 2027 to the ID terminal. In addition, the voltage applying section 2024 includes a pull-up resistance 2241. The pull-up resistance 2241 is connected to the power source line VCC5 at one end, and to the ID signal line at the other end. In other words, the pull-up resistance 2241 is a resistance that applies a predetermined voltage (5 V) to the ID terminal for pulling it up. That is, the voltage applying section 2024 applies the predetermined voltage (5 V) to the ID terminal for pulling it up.

The pull-down resistance 2026 is connected to the aforementioned signal line of the EN signal, to pull down the EN signal. The diode 2028 is configured such that its anode terminal is connected to the other end of the pull-up resistance 2241 and its cathode terminal is connected to the ID terminal. The diode 2028 has such a function that, when a voltage (5 V) higher than the operational voltage (3.3 V) of the interface control section 2027 is applied on the ID terminal, prevents any voltage higher than the operational voltage from being applied to the interface control section 2027.

The interface control section 2027 controls each section of the interface section 2020. The interface control section 2027 determines the type of an apparatus connected to the connector 2021, and switches the image capturing apparatus 2100 between a host and a device in communication with the communication section 2025. The interface control section 2027 controls data communication via the USB interface. The interface control section 2027 includes the judging section 2271.

The judging section 2271 sets the EN signal to the H state based on the ID signal supplied from the apparatus connected to the connector 2021 via the ID terminal, thereby causing the power supply section 2022 to output power. In other words, when the voltage inputted to the ID terminal falls below the predetermined threshold value, the judging section 2271 sets the EN signal to the H state, thereby causing the power supply section 2022 to output power. For example, the judging section 2271 sets the EN signal to the H state when the ID signal is brought into the L state, thereby causing the power supply section 2022 to output power. Therefore, the power supply section 2022 supplies power to the VBUS terminal when the voltage inputted to the ID terminal has been lowered to the predetermined threshold value or below.

The judging section 2271 determines the type of the second apparatus based on the ID signal and the signal supplied from the level shift section 2023, and switches the image capturing apparatus 2100 between a host and a device in communication with the communication section 2025. Specifically, the judging section 2271 determines that the second apparatus is a host, when it has detected the clock signal a predetermined number of times (e.g. 3) or more in the ID terminal during a predetermined period of time after start of power supply from the power supply section 2022 to the VBUS terminal. When the clock signal has not been received a predetermined number of times or more in the ID terminal during this predetermined period of time, the judging section 2271 determines that the second apparatus is a device. When the voltage at the ID terminal is maintained at a higher voltage than a predetermined threshold value, the judging section 2271 determines that the second apparatus is a host. Therefore, the judging section 2271 determines that the second apparatus is a host, when the EN signal is in the L state and the H state has been detected in the signal supplied from the level shift section 2023.

The communication section 2025 is connected to the WT 2300 via the D+terminal and the D−terminal. The communication section 2025 is an example of the first communication section. The communication section 2025 switches the image capturing apparatus 2100 between a host and a device in communication, based on the control signal supplied from the judging section 2271. Specifically, when the judging section 2271 has judged the second apparatus to be a host, the communication section 2025 causes the image capturing apparatus 2100 to act as a device in communicating with the second apparatus. In addition, when the judging section 2271 has judged the second apparatus to be a device, the communication section 2025 causes the image capturing apparatus 2100 to act as a host in communicating with the second apparatus. Since the WT 2300 is a host apparatus in FIG. 16, the communication section 2025 causes the image capturing apparatus 2100 to act as a device in communication with the WT 2300 in this example.

The communication section 2025 includes a host communication section 2251 and a device communication section 2252. The host communication section 2251 is used when communication is performed with the image capturing apparatus 2100 as a host. The device communication section 2252 is used when communication is performed with the image capturing apparatus 2100 as a device.

The following explains the configuration of the WT 2300. FIG. 16 is an example in which the WT 2300 operates based on the power supplied via the VBUS terminal and also functions as a host, as mentioned above. In this drawing, the WT 2300 includes a connector 2031, a low-voltage output section 2032, an oscillation section 2033, a regulator section 2034, a WT control section 2035, and a communication section 2036.

The connector 2031 is a connector (e.g., Mini-A receptacle) for a host to which a device can be connected. The connector 2021 is connected to the connector 2031 via the USB cable, and a Mini-B plug is inserted to the connector 2021, and a Mini-A plug is inserted to the connector 2031. The connector 2031 also includes a VBUS terminal, an ID terminal, a D+terminal, and a D−terminal.

The low-voltage output section 2032 is connected to the ID signal line connected to the ID terminal from the oscillation section 2033. In addition, the low-voltage output section 2032 includes a pull-down resistance 2321. Therefore, the pull-down resistance 2321 outputs a voltage equal to or lower than a predetermined threshold value to the ID terminal, based on the resistance ratio between it and the pull-up resistance 2241. This means that the low-voltage output section 2032 outputs a voltage equal to or lower than the predetermined threshold value to the ID terminal of the connector 2021.

The oscillation section 2033 outputs a clock signal of a predetermined period to the ID terminal, based on the power supplied via the VBUS terminal. An example of this clock signal of a predetermined period may be a clock signal of 1 kHz (kilohertz) frequency. The oscillation section 2033 starts oscillation when receiving power supply via the regulator section 2034 after power supply starts to the VBUS terminal, thereby outputting a clock signal to the ID terminal.

Based on the power supply from the image capturing apparatus 2100 via the VBUS terminal, the regulator section 2034 generates a voltage lower than the voltage (5 V) supplied to the VBUS terminal and outputs it to the power source line VCC3.3. That is, the regulator section 2034 generates a voltage of 3.3V for operating each section of the WT 2300, from the voltage (5 V) supplied to the VBUS terminal, and supplies it to each section. Note that the regulator section 2034 starts generating 3.3V voltage, when the voltage of the VBUS terminal has reached a predetermined voltage or more after starting of power supply to the VBUS terminal.

The WT control section 2035 controls each section of the WT 2300. The WT control section 2035 controls data communication via the USB interface. In other words, the WT control section 2035 controls the communication section 2036 to conduct communication by setting the WT 2300 as a host. The WT control section 2035 also controls communication via the wireless LAN.

The communication section 2036 is connected to the image capturing apparatus 2100 via the D+terminal and the D−terminal. The communication section 2036 is an example of the second communication section. The communication section 2036 communicates with the image capturing apparatus 2100, with the WT 2300 in which the communication section 2036 is included, as a host. In addition, the communication section 2036 includes a host communication section 2361. The host communication section 2361 is used when the communication is performed with the WT 2300 as a host.

A capacitor 2037 is connected between the power source line VCC 3.3 and the ground line. The capacitor 2037 is a bypass capacitor for smoothing out the voltage outputted from the regulator section 2034.

Figure 17:
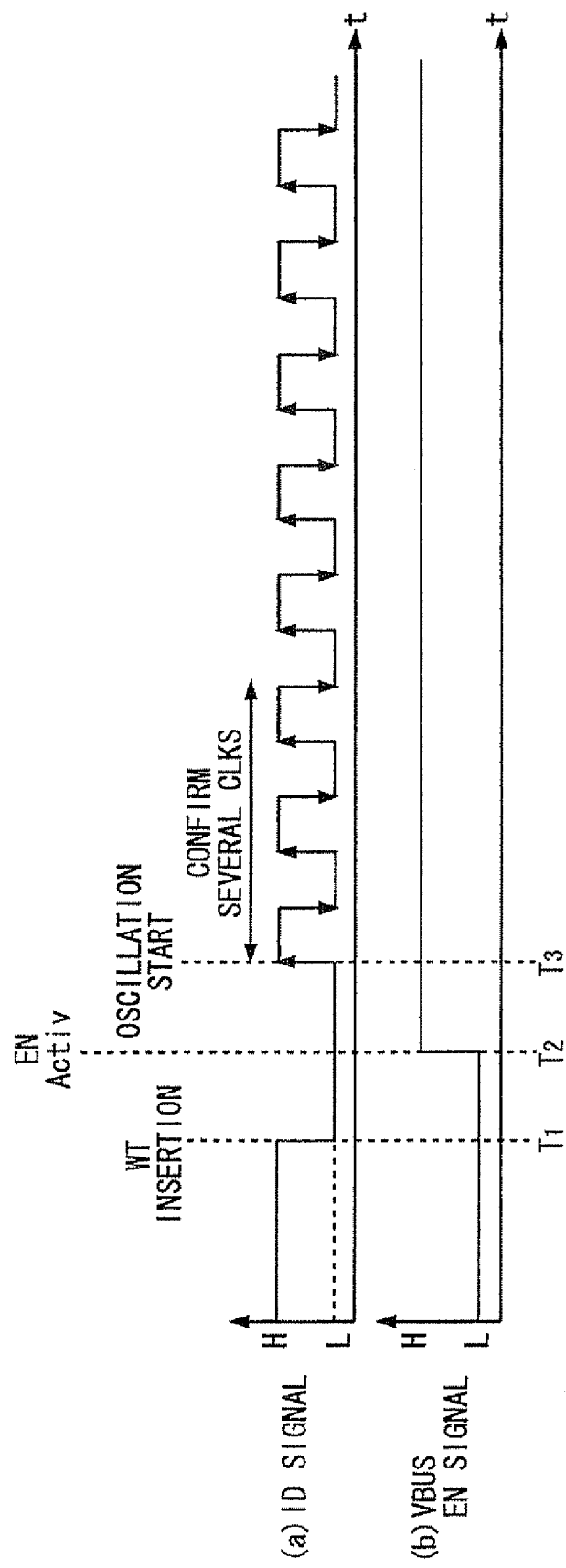
FIG. 17 is a timing chart showing the operation of the interface system according to the present embodiment.

The following explains the operation of the interface system 2001. FIG. 17 is a timing chart showing the operation of the interface system 2001 according to the present embodiment. (a) shows the waveform of the ID signal in the ID terminal. In this drawing, the longitudinal axis represents the state of the ID signal, and the horizontal axis represents the time. (b) shows the waveform at the VBUS terminal and the waveform of the EN signal. In this drawing, the longitudinal axis represents the state of the VBUS terminal and the state of the EN signal, and the horizontal axis represents the time. Note that the horizontal axes for (a) and (b) show the same time of the day.

When there is nothing connected to the connector 2021, the voltage applying section 2024 in the image capturing apparatus 2100 sets the ID terminal to the H state. Accordingly, prior to the time T1, the ID signal exhibits the H state. The VBUS terminal and the EN signal are in the L state. At the time T1, when the WT 2300 is connected to the image capturing apparatus 2100, the low-voltage output section 2032 of the WT 2300 sets the ID terminal to the L state. Accordingly, the ID signal exhibits the L state.

Next, in the image capturing apparatus 2100, the judging section 2271 detects the state of the ID terminal via the diode 2028. The judging section 2271 outputs the H state to the EN signal when the detected state of the ID terminal indicates the L state (time T2). At the time T2, in response to the EN signal supplied from the judging section 2271 being brought into the H state, the power supply section 2022 establishes conduction between the power source line VCC5 and the VBUS terminal, thereby supplying power to the VBUS terminal. In other words, the power supply section 2022 supplies power to the VBUS terminal when the voltage inputted to the ID terminal has lowered to the predetermined threshold value or below. Accordingly, the VBUS terminal and the EN signal will be brought into the H state.

Next, in the WT 2300, the regulator section 2034 supplies power (voltage of 3.3V) to each section of the WT 2300 via the power source line VCC3.3 based on the power supplied via the VBUS terminal. Accordingly, the oscillation section 2033 starts oscillation, and generates 1 kHz clock signal. The oscillation section 2033 outputs the generated clock signal to the ID terminal (time T3).

In the image capturing apparatus 2100, the judging section 2271 detects the state of the ID terminal again, via the diode 2028. When having detected the clock signal at the ID terminal a predetermined number of times (e.g., 3) or more, the judging section 2271 determines that the connected WT 2300 operates based on the power supplied via the VBUS terminal as well as functioning as a host. When having determined that the connected WT 2300 is a host, the judging section 2271 controls the device communication section 2252 of the communication section 2025 to perform communication, with the image capturing apparatus 2100 as a device. In the WT 2300, the WT control section 2035 controls the host communication section 2361 of the communication section 2036 to conduct communication, with the WT 2300 as a host. Accordingly, the data communication can be made possible at the interface system 2001, by setting the image capturing apparatus 2100 as a device and the WT 2300 as a host. The power supply can also be made possible from the image capturing apparatus 2100 (a device), to the WT 2300 (a host), via the VBUS terminal.

Figure 18A:
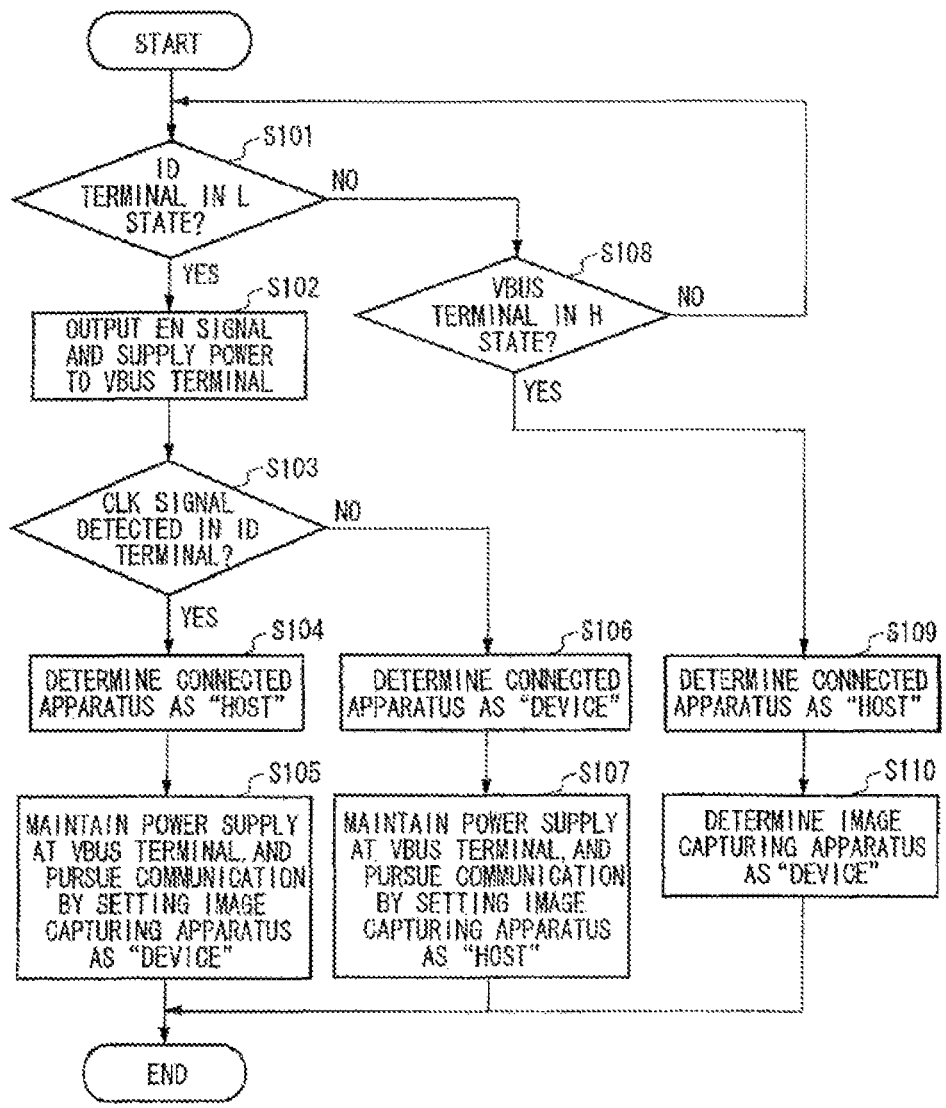
FIG. 18A is a flowchart showing a process performed by the image capturing apparatus according to the present embodiment.
Figure 18B:
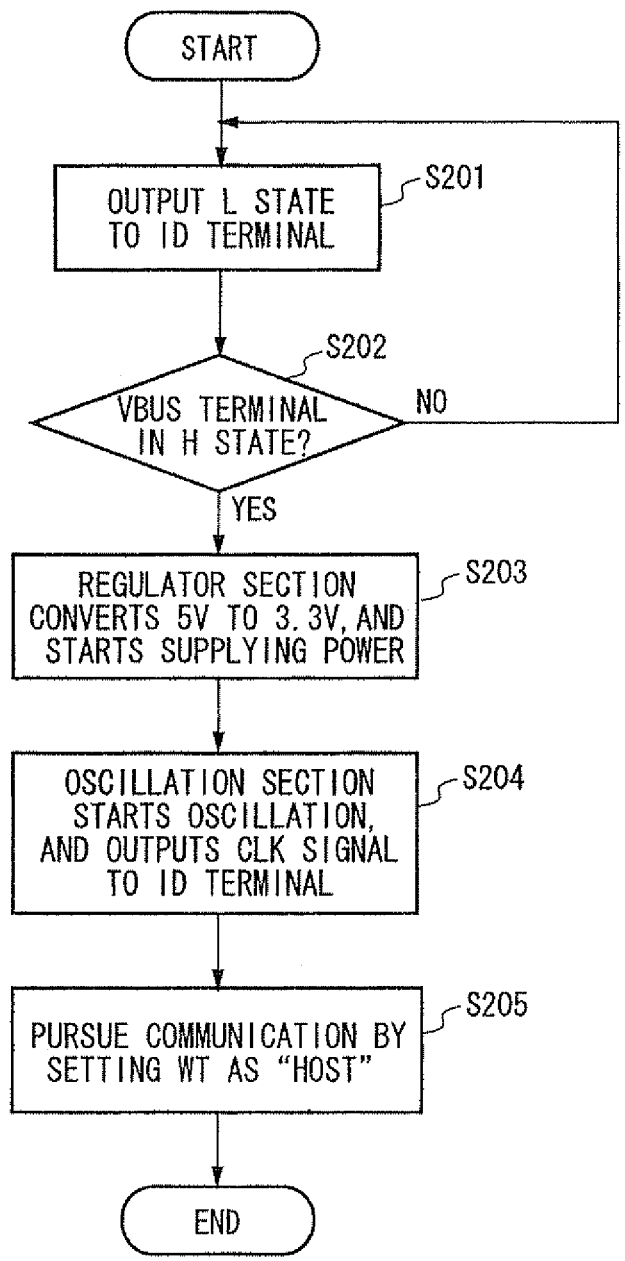
FIG. 18B is a flowchart showing a process performed by the host apparatus according to the present embodiment.

The following details the processing of each of the image capturing apparatus 2100 and the WT 2300 in the present embodiment. FIG. 18A and FIG. 18B are a flowchart showing a process performed by the image capturing apparatus 2100 and the WT 2300 according to the present embodiment. Of these drawings, FIG. 18A shows the processing of the image capturing apparatus 2100 and FIG. 18B shows the processing of the WT 2300.

First, the operation of the image capturing apparatus 2100 is explained with reference to FIG. 18A. In this drawing, the image capturing apparatus 2100 judges whether the ID terminal of the connector 2021 is in the L state (S101). In other words, the judging section 2271 of the image capturing apparatus 2100 judges whether the ID terminal of the connector 2021 is in the L state, and the ID terminal is judged to be in the L state, the process proceeds to Step S102. If the judging section 2271 has judged that the ID terminal is in the H state, the process is moved onto Step S108. When the ID terminal is in the L state, it means that the low-voltage output section 2032 of the WT 2300 connected via the connector 2021 is outputting the L state to the ID terminal.

Next, in the process of Step S102, the judging section 2271 outputs the H state to the EN signal, to supply power to the VBUS terminal of the connector 2021. In other words, the judging section 2271 outputs the EN signal in the H state to the power supply section 2022. In response to the EN signal being brought into the H state, the power supply section 2022 establishes conduction between the power source line VCC5 and the VBUS terminal, thereby supplying power to the VBUS terminal. In other words, the power supply section 2022 supplies power to the VBUS terminal, when the voltage inputted to the ID terminal is in the L state (e.g., when the voltage is lowered down to a predetermined threshold value or less).

Next, the judging section 2271 judges whether a clock signal has been detected at the ID terminal of the connector 2021 (Step S103). Specifically, the judging section 2271 judges whether the clock signal has been detected a predetermined number of times (e.g. 3) or more in the ID terminal during a predetermined period of time after start of power supply from the power supply section 2022 to the VBUS terminal. When the clock signal has been detected a predetermined number of times or more in the ID terminal, the judging section 2271 advances the processing to Step S104. When the clock signal has not been detected a predetermined number of times or more in the ID terminal, the judging section 2271 moves onto Step S106.

In the processing of Step S104, the judging section 2271 determines that the connected apparatus is a host. Next, the image capturing apparatus 2100 maintains power supply to the VBUS terminal from the power supply section 2022, and performs communication with the image capturing apparatus 2100 as a device (Step S105). In other words, the judging section 2271 controls the device communication section 2252 of the communication section 2025 to perform communication as a device.

In the processing of Step S106, the judging section 2271 determines that the connected apparatus is a device. Next, the image capturing apparatus 2100 maintains power supply to the VBUS terminal from the power supply section 2022, and performs communication with the image capturing apparatus 2100 as a host (Step S107). In other words, the judging section 2271 controls the host communication section 2251 of the communication section 2025 to perform communication as a host.

In the step of Step S108, the image capturing apparatus 2100 judges whether the VBUS terminal of the connector 2021 is in the H state. That is, the judging section 2271 of the image capturing apparatus 2100 judges whether the VBUS terminal is in the H state, based on the signal outputted from the level shift section 2023. When having determined that the VBUS terminal is in the H state, the judging section 2271 moves onto Step S109. When having detected that the VBUS terminal is in the L state, the judging section 2271 returns the processing to Step S101, to repeat the processing. In other words, the judging section 2271 judges that the second apparatus is not connected, when the ID terminal is in the H state as well as the VBUS terminal is in the L state, and does not perform data communication using the USB interface.

In the processing of Step S109, the judging section 2271 determines that the connected apparatus is a host (which does not require power supply). In other words, when the voltage of the ID terminal is maintained in the H state (i.e. voltage larger than a predetermined threshold value), the judging section 2271 determines that the second apparatus is a host. Next, the image capturing apparatus 2100 performs communication by setting itself as a device (Step S110). That is, the judging section 2271 controls the device communication section 2252 of the communication section 2025 to perform communication as a device.

In the above-stated manner, the image capturing apparatus 2100 can deal with the following three different cases of the connected apparatus. In the first case, the connected apparatus operates according to the power supplied via the VBUS terminal as well as being a host. In this case, the image capturing apparatus 2100 moves onto Step S101-S105, and performs communication as a device. The image capturing apparatus 2100 supplies power to the connected apparatus via the VBUS terminal. One example of such a case is that the above-mentioned WT 2300 is connected to the image capturing apparatus 2100, and communication is pursued through a wireless LAN.

In the second case, the connected apparatus operates according to the power supplied via the VBUS terminal as well as being a device. In this case, the image capturing apparatus 2100 moves onto Step S101-S103, and further branches the processing to Step S103-S106, and further to Step S107. In this case, the image capturing apparatus 2100 performs communication as a host. The image capturing apparatus 2100 also supplies power to the connected apparatus via the VBUS terminal. One example of such a case is that a printer or the like is connected as a device, to the image capturing apparatus 2100.

In the third case, the connected apparatus is a host that supplies power to the image capturing apparatus 2100 via the VBUS terminal. In this case, the image capturing apparatus 2100 branches the processing to Step S101-S109, and further to Step S110. In this case, the image capturing apparatus 2100 performs communication as a device. In addition, the image capturing apparatus 2100 does not supply power to the connected apparatus via the VBUS terminal. One example of such a case is that a personal computer functioning, being a host, is connected to the image capturing apparatus 2100.

As stated above, the interface system 2001 according to the present embodiment includes an image capturing apparatus 2100 and a WT 2300. In addition, the image capturing apparatus 2100 includes a connector 2021 that includes a VBUS terminal and an ID terminal, a power supply section 2022 that supplies power to the VBUS terminal, and a judging section 2271 that judges that the WT 2300 is a host, when having detected the clock signal a predetermined number of times or more in the ID terminal within a predetermined period of time after power supply start. Note that the connector 2021 is a connector (e.g., Mini-AB receptacle) connectable regardless of whether the connected apparatus is a host that controls communication or a device whose communication is controlled. In addition, the WT 2300 includes an oscillation section 2033 that outputs a clock signal of a predetermined period to the ID terminal, based on the power supplied via the VBUS terminal.

Accordingly, the image capturing apparatus 2100 can accurately determine that the connected apparatus operates according to the power supplied via the VBUS terminal as well as being a host. For this purpose, the interface system 2001 and the image capturing apparatus 2100 can supply power from the device to the host, in any case where the apparatus supplying power via the VBUS terminal can be connectable to any of a host and a device.

The image capturing apparatus 2100 further includes a voltage applying section 2024 that applies a predetermined voltage to the ID terminal for pulling it up. Further, the power supply section 2022 supplies power to the VBUS terminal when the voltage inputted to the ID terminal has fallen below a predetermined threshold value. In addition, the WT 2300 includes a low-voltage output section 2032 that outputs a voltage equal to or below the predetermined threshold value. Accordingly, the image capturing apparatus 2100 can accurately detect whether the WT 2300 requires power supply via the VBUS terminal, by detecting the state of the ID terminal. Accordingly, the image capturing apparatus 2100 can secure stable power supply to the WT 2300.

Further, the image capturing apparatus 2100 includes a communication section 2025 that communicates with the WT 2300 by setting the image capturing apparatus 100 as a device, when the judging section 2271 has determined that the WT 2300 is a host. In addition, the WT 2300 includes a communication section 2036 (second communication section) that performs communication with the image capturing apparatus 2100, by setting the WT 2300 as a host. With this configuration, the interface system 2001 can deal with communication in which the image capturing apparatus 2100 functions as a device and the WT 2300 functions as a host.

In addition, the WT 2300 includes a low-voltage output section 2032 that outputs a voltage that is equal to or below a predetermined threshold value to the ID terminal, an oscillation section 2033 that outputs a clock signal of a predetermined period to the ID terminal based on the power supplied via the power supply terminal of the connector, and a communication section 2036 that functions as a host in communicating with the connected apparatus. In addition, the WT 2300 receives power supply necessary for operation, from the connected apparatus via the VBUS terminal. According to this configuration, the WT 2300 can receive power supply necessary for operation, in any case where the apparatus supplying power via the VBUS terminal can be connectable to any of a host and a device.

In addition, when the voltage at the ID terminal is maintained at a voltage larger than a predetermined threshold value, the judging section 2271 determines that the second apparatus (not requiring power supply) is a host. With this configuration, the interface system 2001 can deal with communication in which the image capturing apparatus 2100 functions as a device and the connected apparatus functions as a host (not requiring power supply).

Next, the operation of the WT 2300 is explained with reference to FIG. 18B. In this drawing, when the WT 2300 is connected to the image capturing apparatus 2100, the low-voltage output section 2032 of the WT 2300 first sets the ID terminal of the connector 2021 to the L state (Step S201). Next, the WT 2300 waits until the power is supplied to the VBUS terminal (Step S202). When the VBUS terminal starts receiving voltage, the WT 2300 moves onto Step S203. Next, in the processing of Step S203, the regulator section 2034 of the WT 2300 starts supplying power. In other words, the regulator section 2034 generates 3.3V, being the power source voltage of the WT 2300, based on the power supplied via the VBUS terminal, and supplies it to the power source line VCC3.3.

Next, the oscillation section 2033 of the WT 2300 starts oscillating, and outputs a clock signal to the ID terminal (Step S204). Specifically, the oscillation section 2033 generates a 1 kHz clock signal based on the power supplied via the VBUS terminal. The oscillation section 2033 outputs the generated clock signal to the ID terminal.

Next, in the WT 2300, the WT control section 2035 controls the host communication section 2361 of the communication section 2036 to perform communication by setting the WT 2300 as a host (Step S205). With this configuration, the WT 2300, being a host, can act as a host operating based on the power supplied via the VBUS terminal, and communicate data with the image capturing apparatus 2100, being a device, via the USB interface.

Figure 19:
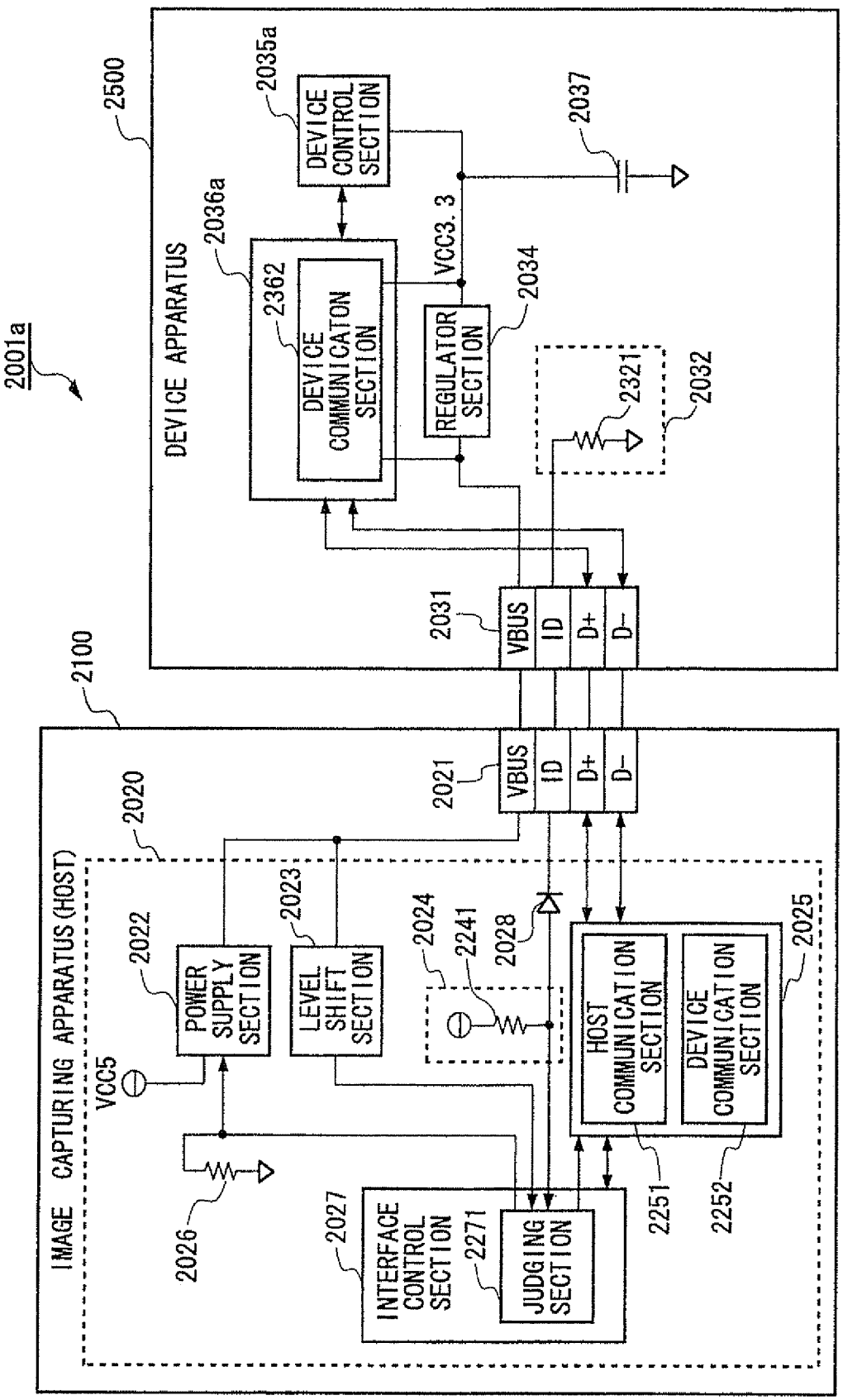
FIG. 19 is a schematic block diagram showing another connection example of the image capturing apparatus according to the present embodiment.

The following explains a case where the second apparatus, being a device, is connected to the image capturing apparatus 2100. FIG. 19 is a schematic block diagram showing another connection example of the image capturing apparatus 2100 according to the present embodiment. In this drawing, the interface system 2001a includes an image capturing apparatus 2100 and a device apparatus 2500 connected via the USB interface. In addition, the configurations in this drawing similar to those in FIG. 16 are assigned the same reference numerals. The device apparatus is one example of the second apparatus. In this drawing, the image capturing apparatus 2100 is a host, and the device apparatus 2500 is a device. In other words, the interface system 2001a is one example in which the second apparatus is a device. The device apparatus 2500 operates according to the power supplied via the VBUS terminal.

The device apparatus 2500 includes a connector 2031, a low-voltage output section 2032, a regulator section 2034, a device control section 2035a, and a communication section 2036a. The device control section 2035a controls each section of the device apparatus 2500. The device control section 2035a controls data communication performed via the USB interface. In other words, the device control section 2035a controls the communication section 2036a by setting the device apparatus 2500 as a device.

The communication section 2036a is connected to the image capturing apparatus 2100 via the D+terminal and the D−terminal. The communication section 2036a is one example of the third communication section. The communication section 2036a communicates with the image capturing apparatus 2100, by setting the device apparatus 2500 including therein the communication section 2036a as a device. In addition, the communication section 2036a includes a device communication section 2362. The device communication section 2362 is used when performing communication, by setting the device apparatus 2500 as a device.

The following explains the operation of the interface system 2001a. In the interface system 2001a, when the device apparatus 2500 is connected to the image capturing apparatus 2100, the low-voltage output section 2032 of the device apparatus 2500 first brings the ID terminal into the L state. Next, the image capturing apparatus 2100 performs the aforementioned processing in the second case. Specifically, the image capturing apparatus 2100 moves onto Steps S101-S103 of FIG. 18A, branches the processing to Steps S103-S106 of FIG. 18A, and moves further onto Step S107 of FIG. 18A. Accordingly, the image capturing apparatus 2100 performs communication by setting itself as a host. The image capturing apparatus 2100 supplies power to the connected apparatus, via the VBUS terminal.

On the side of the device apparatus 2500, the regulator section 2034 generates 3.3V, being a power source voltage of the device apparatus 2500, based on the power supplied via the VBUS terminal, and supplies it to the power source line VCC3.3. Then, the device control section 2035a controls the host communication section 2361 of the communication section 2036 to perform communication by setting the device apparatus 2500 as a host.

As explained above, in the interface system 2001a, the device apparatus 2500 includes a low-voltage output section 2032 that outputs a voltage equal to or below a predetermined threshold value, to the ID terminal of the connector 2021, and a communication section 2036 that communicates with the image capturing apparatus 2100 by setting the device apparatus 2500 as a device. In addition, when not having detected the clock signal a predetermined number of times or more at the ID terminal within a predetermined period of time, the judging section 2271 determines that the device apparatus 2500 is a device. The communication section 2025 communicates with the device apparatus 2500, by setting the image capturing apparatus 2100 as a host. Accordingly, the interface system 2001a can deal with such a communication in which the image capturing apparatus 2100 acts as a host and the WT 2300 acts as a device.

Note that the present invention is not limited to the above-explained embodiment(s), and can be modified within the scope not departing from the main purpose of the present invention. For example, an USB interface is used in the above-described embodiment(s), however, a different interface may also be used. In addition, the USB interface may either comply with the USB 2.0 standard or the USB 3.0 standard. In addition, although the connector 2021 is a Mini-AB receptacle in the above-described embodiment(s), an embodiment using a Micro-AB receptacle is also possible. Any different embodiment is also possible as long as it uses a connector (AB receptacle) connectable to a host and a device.

Also in the above-described embodiment(s), the first apparatus is not limited to the image capturing apparatus 2100, and can also be another apparatus. The second apparatus is also not limited to the WT 2300, and can also be another apparatus. For example, the second apparatus may be a portable printer or a portable terminal. The second apparatus can include a USB plug at the tip of a cable provided on the main body, instead of including a connector 2031.

Also in the above-described embodiment(s), each of the interface control section 2027, the WT control section 2035, and the device control section 2035a can also be realized by a dedicated hardware. It is also possible that each of the interface control section 2027, the WT control section 2035, and the device control section 2035a be made up of a memory and a CPU, and the function of each section is realized by a program. For example, each of the interface control section 2027, the WT control section 2035, and the device control section 2035a can be constituted by an ASIC (Application Specific Integrated Circuit). Moreover, the detection of the ID signal by the judging section 2271, the detection of the signal outputted from the level shift section 2023, and the outputting of the EN signal may be pursued by using the GPIO (General Purpose Input/Output) terminal included in the ASIC.

Also in the above-described embodiment, the image capturing apparatus 2100 includes a level shift section 2023. However, when the power source voltage at which the interface control section 2027 operates rests within the range of voltages supplied to the VBUS terminal, the level shift section 2023 can be omitted. Likewise, the WT 2300 includes a regulator section 2034 in the above-described embodiment. However, when the power source voltage at which each section of the WT 2300 operates rests within the range of voltages supplied to the VBUS terminal, the regulator section 2034 can be omitted. Moreover, the communication section 2025 of the image capturing apparatus 2100 includes a host communication section 2251 and a device communication section 2252, in the above-described embodiment. However, the host communication section 2251 may be omitted from the communication section 2025. Such a configuration helps simplify the processing of the communication section 2025.

In addition, the WT 2300 generates a clock signal by means of the oscillation section 2033, in the above-stated embodiment. However, the clock signal may be generated by software processing of the WT control section 2035.

The above-described image capturing apparatus 2100 includes therein a computer system. The process taken by the judging section 2271 as described above is stored in a computer readable storage medium in the form of a program, and the process is carried out by the computer reading out this program and executing it. Here, the computer readable storage medium is a magnetic disk, a magnet-optical disk, a CD-ROM, a DVD-ROM, a semiconductor memory, or the like. Another configuration is also possible in which this computer program is distributed to a computer via a communication line, and the computer having received this distribution executes this program.

According to the interface system 2001 and the interface system 2001a as described above, even when the apparatus supplying power via the power supply terminal can be connected to any of a host and a device, the power can be always supplied from the device to the host. In addition, an electronic appliance connectable to any of a host and a device as well as enabling to supply power from the device to the host can be provided. In addition, a host apparatus that receives power supply from an electronic appliance via a power supply terminal can be provided.

An USB (Universal Serial Bus) interface system is known as a general interface system. Apparatuses connectable to this USB interface system include a host, a device, and a dual role device that can both function as a host and a device. The host is an apparatus (e.g., personal computer) controlling communication, and the device is an apparatus (e.g., peripheral appliance) whose communication is controlled. In addition, the USB interface system has such a specification that allows power source supply to an apparatus connected to the USB interface system, via the VBUS terminal. In a conventional USB interface system, a device can receive power supply via the VBUS terminal. However, with the prevalence of the portable appliances and the increase in the variety of apparatuses, it is increasingly demanded to enable a host to receive power supply via the VBUS terminal. For example, when attempting to connect a camera, being a device, to a wireless transmitter that uses a wireless LAN (Local Area Network), sometimes power supply becomes necessary from the camera to the WT. In such an interface system, the device supplies power to the host (e.g., Japanese Patent Application Publication No. 2005-25405).

However, the interface system as disclosed in Japanese Patent Application Publication No. 2005-25405 makes it mandatory that the apparatus supplying power to the host via the VBUS terminal should include the B receptacle (e.g., Mini-B receptacle) being a connector used for a device. In other words, it is required that the aforementioned apparatus supplying power to the host via the VBUS terminal is always a device and another apparatus connected thereto is always a host. In line with this limitation, the interface system disclosed in Japanese Patent Application Publication No. 2005-25405 cannot deal with a case in which the type of the connected apparatus is not predetermined as to whether it is a host or a device. In other words, the interface system described in Japanese Patent Application Publication No. 2005-25405 has such a problem that the power supply cannot be possible from the device to the host, when the apparatus that supplies power via the power supply terminal is connectable to a host and a device. However, the electronic appliance system, the interface system 2001, and the interface system 2001a as described with reference to FIG. 1 through FIG. 14 enable the power supply from the device to the host, even when the apparatus supplying power via the power supply terminal is connectable to a host and a device.

Although some aspects of the present invention have been described by way of exemplary embodiments, it should be understood that those skilled in the art might make many changes and substitutions without departing from the spirit and the scope of the present invention which is defined only by the appended claims.

The operations, the processes, the steps, or the like in the apparatus, the system, the program, and the method described in the claims, the specification, and the drawings are not necessarily performed in the described order. The operations, the processes, the steps, or the like can be performed in an arbitrary order, unless the output of the former-described processing is used in the later processing. Even when expressions such as "First," or "Next," or the like are used to explain the operational flow in the claims, the specification, or the drawings, they are intended to facilitate the understanding of the invention, and are never intended to show that the described order is mandatory.

What is claimed is:

1. An electronic appliance comprising:
   a connecting section that includes a power-supply terminal and a ID terminal to be connected to a connecting appliance, wherein a potential of the ID terminal is in a first potential level when the connecting appliance is not connected;
   a detecting section configured to detect the potential of the ID terminal;
   a power source control section configured to start supplying power via the power-supply terminal to the connecting appliance when the potential of the ID terminal has changed to a second potential level; and
   an appliance recognizing section configured to:
   recognize that a first type of connecting appliance has been connected when the potential of the ID terminal changes from the second potential level to the first potential level within a predetermined period of time after the power supply start, and
   recognize that a second type of connecting appliance has been connected when the potential of the ID terminal does not change within the predetermined period of time after the power supply start.

2. The electronic appliance according to claim 1, further comprising a voltage applying section configured to apply a predetermined voltage to the ID terminal for performing pull-up.

3. The electronic appliance according to claim 1, wherein the appliance recognizing section is configured to recognize that the connecting appliance does not require power supply, when the potential of the power-supply terminal has changed but the potential of the ID terminal has not changed to the second potential level.

4. An electronic appliance comprising:
   a connecting section that includes a power-supply terminal and a ID terminal to be connected to a connecting appliance, wherein a potential of the ID terminal is in a first potential level when the connecting appliance is not connected;
   a detecting section configured to detect the potential of the ID terminal;
   a power source control section configured to start supplying power via the power-supply terminal to the connecting appliance when the potential of the connecting terminal has changed to a second potential level; and
   an appliance recognizing section configured to
   recognize that a first type of connecting appliance has been connected when the potential of the ID terminal changes from the second potential level to the first potential level within a predetermined period of time after the power supply start, then after elapse of the predetermined period of time the potential of the ID terminal has changed to the second potential level, and
   recognize that a second type of connecting appliance has been connected when if the potential of the ID terminal does not change to the first potential level within the predetermined period of time after the power supply start.

5. The electronic appliance according to claim 4, wherein the power source control section is configured to stop the power supply when the potential of the ID terminal has changed to the first potential level from the second potential level, after the elapse of the predetermined period of time.

6. The electronic appliance according to claim 1, wherein:
   the connecting section is a USB connecting section to which any of a USB device and a USB host is connectable;
   the ID terminal is of the USB connecting section;
   the potential of the ID terminal is in an H level when the connecting appliance is not connected;
   the power source control section is configured to start supplying power to the connecting appliance when the potential of the ID terminal has changed to an L level; and
   when the potential of the ID terminal has changed from the L level to the H level within the predetermined period of time, the appliance recognizing section is configured to recognize that the connecting appliance communicates as a USB host, and requires power supply.

7. The electronic appliance according to claim 6, further comprising a communication control section configured to communicate with the connecting appliance as a USB device when the potential of the ID terminal has changed from the L level to the H level within the predetermined period of time, and configured to communicate with the connecting appliance as a USB host when the potential of the ID terminal has not changed from the L level to the H level within the predetermined period of time.

8. The electronic appliance according to claim 1, wherein the power source control section configured to supply power to the power-supply terminal from a battery that drives the electronic appliance.

9. The electronic appliance according to claim 1, further comprising:
   an image capturing section configured to capture an image; and
   an image output section configured to output the image as image data to the connecting appliance,
   wherein the appliance recognizing section configured to recognize whether the connecting appliance is a first type of connecting appliance to which the image should be transmitted as the image data, based on the result of detecting the potential of the ID terminal after the power supply start, and
   when the image is determined to be transmitted as the image data, the image output section is configured to transmit the image as image data.

10. The electronic appliance according to claim 9, wherein:
    the appliance recognizing section is configured to recognize whether the image data should be transmitted based on a request from the connecting appliance, based on the result of detecting the potential of the ID terminal after the power supply start; and
    the image output section is configured to transmit the image data based on a request from the connecting appliance when it is recognized that the image data should be transmitted based on a request from the connecting appliance, and is configured to announce transmission of the image data to the connecting appliance, when it is recognized that the image data should not be transmitted based on a request from the connecting appliance.

11. The electronic appliance according to claim 9, wherein:
the appliance recognizing section is configured to recognize that the image should be transmitted as the image data to the connecting appliance, when the potential of the ID terminal changed after the power supply start, and recognizes that the image should be transmitted as an analog signal to the connecting appliance, when the potential of the ID terminal did not change after the power supply start; and
the image output section is configured to output the image data as an analog signal to the connecting appliance, when it is recognized that the image should be transmitted as an analog signal to the connecting appliance.

12. The electronic appliance according to claim 9, wherein the appliance recognizing section is configured to recognize that image data should be transmitted to the connecting appliance in a format different from the format used to transmit image data to the first type connecting appliance, when the potential of the power-supply terminal has changed but the potential of the ID terminal has not changed.

13. An electronic appliance system comprising:
a connecting appliance including
a connecting section that includes a power-supply terminal and a connected terminal to be electrically connected to a ID terminal of an electronic appliance, wherein a potential of the ID terminal is in a first potential level when the electronic appliance is not connected, and
a first circuitry section that changes the potential of the ID terminal from the first potential level to a second potential level, when the connected terminal is electrically connected to the ID terminal, and changes the potential of the ID terminal from the second potential level, when supplied with power from the electric appliance via the power-supply terminal, and
a second circuitry section that changes the potential of the ID terminal from the first potential level to the second potential level, when a predetermined period of time has passed after the power supply start via the power-supply terminal, and
an electronic appliance including:
a detecting section configured to detect the potential of the ID terminal;
a power source control section configured to start supplying power via the power-supply terminal, when a change in potential of the ID terminal has changed to the second potential level; and
an apparatus recognizing section configured to
recognize that a first type of connecting appliance has been connected when the potential of the ID terminal changes from the second potential level to the first potential level within a predetermined period of time after the power supply start, and
recognize that a second type of connecting appliance has been connected when the potential of the ID terminal does not change within the predetermined period of time after the power supply start.

14. The connecting appliance according to claim 13, wherein the first circuitry section is configured to change the potential of the ID terminal from the second potential level to the first potential level, when supplied with power from the electronic appliance via the power-supply terminal.

15. The connecting appliance according to claim 13, further comprising a communication control section configured to start communication with the electronic appliance, when the second circuitry section has changed the potential of the ID terminal to the second potential level.

16. The connecting appliance according to claim 14, wherein the first circuitry section includes a first transistor configured to perform a switching operation by means of a power source voltage inputted to the power-supply terminal.

17. The connecting appliance according to claim 16, wherein the first potential level is higher than a ground potential, and the first transistor includes a collector terminal connected to the connected terminal, a grounded emitter terminal, and a base terminal connected to the power-supply terminal.

18. The connecting appliance according to claim 17, wherein the second circuitry section includes:
a second transistor that includes a collector terminal connected to the connected terminal and a grounded emitter terminal; and
a control circuit that is connected to a base terminal of the second transistor, the control circuit being configured to switch ON the second transistor when the predetermined period of time has passed after the power supply start via the power-supply terminal.

19. The connecting appliance according to claim 14, wherein:
the first potential level is higher than the ground potential;
the first circuitry section includes a collector terminal connected to the connected terminal, a grounded emitter terminal, and a base terminal connected to the power-supply terminal via a resistance; and
the second circuitry section includes a capacitor connected in parallel to the resistance.

20. The connecting appliance according to claim 13, wherein the connecting section is a USB connecting section, and the connecting appliance further comprises a USB host controller configured to perform as a USB host in communication with the electronic appliance.

21. The connecting appliance according to claim 20, further comprising an antenna section, wherein the USB host controller is configured to transmit a signal received at the antenna section, to the electronic appliance via a data terminal included in the USB connecting section.

22. The connecting appliance according to claim 13, wherein the first circuitry section includes a sending section configured to output a predetermined clock signal to the ID terminal, when supplied with a power via the power-supply terminal.

23. The connecting appliance according to claim 22, further comprising a communication control section configured to start communication with the electronic appliance, after the sending section has outputted the predetermined clock signal to the ID terminal.

24. A computer readable medium for storing a program for an electronic appliance, the program, when executed by at least one processor, causes the electronic appliance to perform operations including:
detecting a potential of a ID terminal connected to a connecting appliance, such that the potential of the ID terminal is in a first potential level when the connecting appliance is not connected;
starting power supply via a power-supply terminal included in a connecting section configured to connect to the connecting appliance when the potential of the ID terminal has changed to a second potential level;

recognizing that a first type of connecting appliance has been connected when the potential of the ID terminal changes from the second potential level to the first potential level within a predetermined period of time after the power supply start; and recognizing that a second type of connecting appliance has been connected when the potential of the ID terminal does not change within the predetermined period of time after the power supply start.

* * * * *